United States Patent
Goel et al.

(10) Patent No.: US 6,661,797 B1
(45) Date of Patent: Dec. 9, 2003

(54) QUALITY OF SERVICE BASED PATH SELECTION FOR CONNECTION-ORIENTED NETWORKS

(75) Inventors: Ashish Goel, Marine Del Rey, CA (US); Deepak Kataria, Edison, NJ (US); Dimitris Logothetis, North Bergen, NJ (US); Kajamalai Gopalaswamy Ramakrishnan, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/514,725

(22) Filed: Feb. 28, 2000

(51) Int. Cl.[7] .................................................. H04L 12/28

(52) U.S. Cl. .................................. 370/395.21; 709/240

(58) Field of Search .................................. 370/351, 357, 370/360, 396, 395.2, 395.21, 395.31, 395.32, 395.41; 709/238, 240

(56) References Cited

PUBLICATIONS

R. Hassin,, *Approximation schemes for the restricted Shortest Path Problem*, Mathematics Of Operations Research, pp. 36–42, Vol 17, No. 1, Feb. 1992.

Primary Examiner—Hassan Kizou
Assistant Examiner—Dmitri Levitan

(57) ABSTRACT

Arrangements and methods for efficiently selecting an optimum connection path that meets user specified delay requirements with enhanced efficiency. In a basic aspect, a method is implemented by one of a plurality of algorithms to meet user QoS specifications. The user not only specifies a delay threshold T for the incoming request but also specifies a delay threshold tolerance $\epsilon$ for the path delay that will satisfy him. Two implementations are disclosed. The first is termed non-iterative and sets scaling factor $\tau = \min(T, (n-1)/\epsilon)$, where n is a number of links in a shortest path, scales all the relevant delay parameters by $\tau/T$, truncates all the scaled values to integers, and uses a dynamic programming algorithm to accumulate the total of resulting link delay parameters values for each possible shortest path. The second method, termed iterative, is similar, except that it sets $\tau \ll T$. Then if the scaling, truncation, and accumulation steps do not satisfy customer specifications, the next iteration doubles $\tau$. Both methods compute paths from one source to all destinations in a computationally efficient manner.

14 Claims, 19 Drawing Sheets

ADDITIVE DELAY PATH SELECTION ALGORITHM FROM NODE 1 TO ALL OTHER NODES WITH A DELAY CONSTRAINT UP TO T FOR A "FLAT" NETWORK – ALG1

PRECOMPUTATION OF ROUTING TABLES FOR A "FLAT" NETWORK
USING THE ADDITIVE DELAY ACCUMULATION METHOD

BW(k): REQ. BANDWIDTH OF A
    CALL OF TYPE "k"
LINK BW: LINK BANDWIDTH
ALG1: ALGORITHM OF FIGS. 4A AND 4B

CALL SETUP PROCEDURE FOR A "FLAT" NETWORK
USING THE ADDITIVE DELAY ACCUMULATION METHOD

CTD: CELL TRANSFER DELAY
CSP: CONSTRAINED SHORTEST PATH
 BW: BANDWIDTH
ALG1: ALGORITHM OF FIGS. 4A AND 4B

PATH SELECTION ALGORITHM FROM NODE 1 TO ALL OTHER NODES BASED ON AN ASYMPTOTIC ACCUMULATION METHOD WITH A WEIGHT CONSTRAINT UP TO L AND DELAY CONSTRAINT UP TO T FOR A "FLAT" NETWORK — ALG2

PRECOMPUTATION OF ROUTING TABLES FOR A "FLAT" NETWORK
USING AN ASYMPTOTIC DELAY ACCUMULATION METHOD

BW(k): BANDWIDTH REQUIREMENT
       OF A CALL OF TYPE "k"
LINKBW: LINK BANDWIDTH
  ALG2: THE ALGORITHM OF FIGS. 7A & 7B
 AW(K): UPPER BOUND ON THE LINK LENGTH OF A
        PATH THAT A CALL OF TYPE "k" WILL USE

CALL SETUP PROCEDURE FOR A "FLAT" NETWORK
USING AN ASYMPTOTIC DELAY ACCUMULATION METHOD

CTD: CELL TRANSFER DELAY
ALG2: THE ALGORITHM OF FIGS. 7A AND 7B
CSP: CONSTRAINED SHORTEST PATH
BW: BANDWIDTH

BW(k): BANDWIDTH REQUIREMENT
OF A CALL OF TYPE "k"
ALG2: THE ALGORITHM
OF FIGS. 7A & 7B
LINKBW: LINK BANDWIDTH

CALL SETUP PROCEDURE EXECUTED AT NODE 1 FOR A HIERARCHICAL USING AN ADDITIVE DELAY ACCUMULATION METHOD

CTD: CELL TRANSFER DELAY
ALG1: THE ALGORITHM OF FIGS. 4A AND 4B
CSP: CONSTRAINED SHORTEST PATH
BW: BANDWIDTH

CALL SETUP PROCEDURE EXECUTED AT NODE 1 FOR A HIERARCHICAL USING AN ADDITIVE DELAY ACCUMULATION METHOD

CTD: CELL TRANSFER DELAY
ALG1: THE ALGORITHM OF FIGS. 4A AND 4B
CSP: CONSTRAINED SHORTEST PATH
BW: BANDWIDTH

PRECOMPUTATION OF ROUTING TABLES FOR NODE 1 FOR A HIERARCHICAL NETWORK USING AN ASYMPTOTIC DELAY ACCUMULATION METHOD

BW(k): BANDWIDTH REQUIREMENT OF A CALL OF TYPE "k"
LINKBW: LINK BANDWIDTH
ALG2: DELAY-BASED PATH SELECTION, ASYMPTOTIC DELAY ACCUMULATE

CALL SETUP PROCEDURE EXECUTED AT NODE 1 FOR A HIERARCHICAL NETWORK USING AN ASYMPTOTIC DELAY ACCUMULATION METHOD

CTD: CELL TRANSFER DELAY
ALG2: DELAY BASED PATH SELECTION ALGORITHM-ASYMPTOTIC ACCUMULATION
CSP: CONSTRAINED SHORTEST PATH
BW: BANDWIDTH

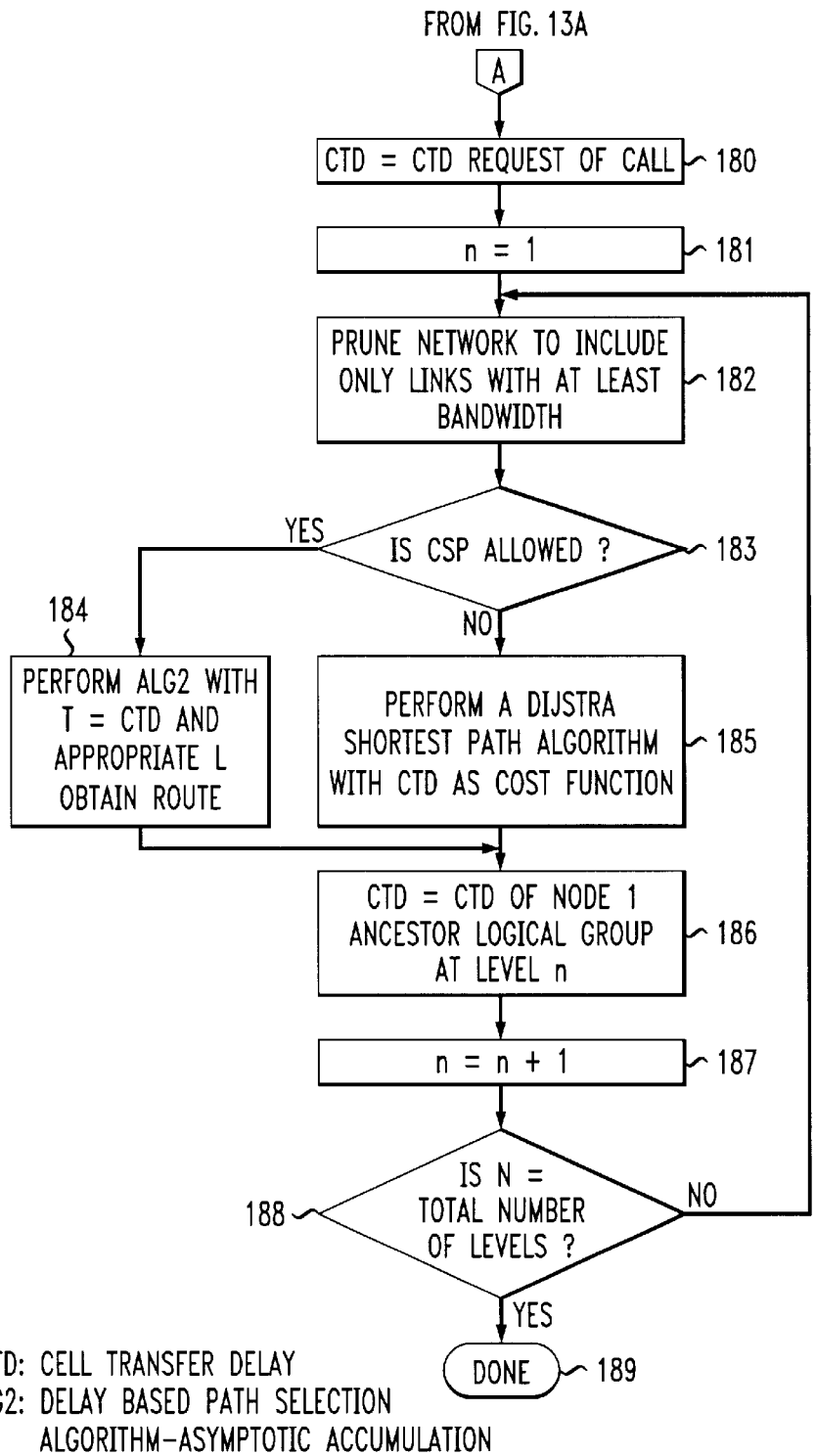

HIERARCHICAL NETWORK

QUALITY OF SERVICE BASED PATH SELECTION FOR CONNECTION-ORIENTED NETWORKS

TECHNICAL FIELD

This invention relates generally to the field of telecommunications and in particular to a more efficient method for selecting a transmission path in a connection-oriented network.

BACKGROUND OF THE INVENTION

It is apparent that connection-oriented networks will play an increasing role in data networking. Connection-oriented networking offers important advantages over connectionless networks, including the advantage of providing Quality of Service (QoS) guarantees, which facilitate new classes of applications such as multimedia, voice over internet protocol, and other real-time services.

A connection-oriented network includes of a set of switches interconnected by point-to-point links or interfaces. The switches support two kinds of interfaces: user-network interfaces (UNI) and network-to-network or network-node interfaces (NNI). A UNI connects end-systems (hosts, routers, and so on) to a switch, while an NNI may be imprecisely defined as an interface connecting two switches together. More precisely, however, an NNI is any physical or logical link across which two switches exchange the NNI protocol. Various NNI protocols, such as the Private Network-Network Interface (PNNI) protocols designed for asynchronous-transfer-mode networks, include a routing protocol that exchanges metrics, such as available and maximum bandwidth, cell loss ratio (CLR), cell delay variation (CDV), and cell transfer delay (CTD), related to Quality of Service (QoS). Routes are then computed using the data collected by the routing protocol. Most commonly-used route determination algorithms (such as Dijkstra shortest path algorithm) use a single, cumulative metric such as link weightings (i.e., administrative weight, hereinafter AW) or costs that relate to the efficient use of the network.

For example, cell loss ratio (CLR) is one of the metrics, or measurements, that can used to determine whether a given network cell, consisting of a link or node or concatenation of links and nodes, can meet the requested quality of service (QoS). Cell delay variation (CDV) and cell transfer delay (CTD) are other such metrics or measurements. In contrast, administrative weight (AW) is a measurement of cost that relates to the efficient use of the network.

Other path selection algorithms, as the one proposed in the PNNI v1.0 standard, use a simple Generic Connection Admission Control (SGCAC) procedure to account for bandwidth. However, neither the SGCAC nor the complex GCAC proposed in PNNI v1.0 is effective in providing the QoS guarantees expected by many data networking customers.

In more detail, the problems in connection-oriented data networking arise out of the following typical existing situations.

As an example of routing and signaling in a connection-oriented network, the PNNI signaling protocol is used to set up asynchronous-transfer-mode switch connections between the source end-system and the destination end-system. The UNI signaling request is mapped into PNNI signaling at the ingress switch. The PNNI signaling is remapped back into UNI signaling at the egress switch. The PNNI signaling protocol is an extension of the UNI signaling and incorporates additional Information Elements (IEs) for PNNI related parameters such as the Designated Transit List (DTL). The PNNI routing protocol is used to disseminate topology, loading conditions and reachability data. For scalability reasons, the notion of hierarchical peer groups is created with Peer Group Leaders (PGLs) elected for each peer group. The PNNI routing protocol is used for hierarchical aggregation and propagation of information. Data about a peer group is aggregated by the peer group leader, which then distributes this data to all the nodes in the higher-level peer group in PNNI Topology State Packets (PTSPs). Thus, aggregated data is passed "up" the hierarchy by peer group leaders. Nodes in a peer group receiving data sent by one of their peer nodes at the higher levels of hierarchy distribute the received data "down" the hierarchy. This allows a switch to maintain a view of the "global" topology with reachability information for endpoints.

The PNNI routing protocol supports a large number of link and node state parameters that are advertised by the switches to indicate their current state at regular intervals which enables QoS-sensitive routing. This includes two types of parameters: attributes, such as Available Cell Rate, Cell Rate Margin, Variance Factor, used to determine whether a given network link or node can meet requested QoS; and metrics, such as maxCDV, CTD, CLR, AW, that are used to determine whether a given path, consisting of a set of concatenated links and nodes (with summed link metrics), can meet the requested QoS. The link metrics and attributes are per port per service category. Individual nodes (physical or logical) will need to determine and then advertise the values of these parameters for themselves.

As a result of these exchanges, a topology database is created, which has reachability information for all the network nodes and the available resources on the network links and nodes. All network nodes can obtain an estimate of the current state of the entire network. Unlike most current link state protocols, the PNNI routing protocol advertises not only link metrics but also nodal information.

When a switch receives a connection setup request, a number of steps are executed. Among these are Connection Admission Control (CAC), Generic Connection Admission Control (GCAC) and shortest path computation. CAC is used to determine if the requested connection can be admitted without violating QoS guarantees of established connections. CAC is a local switch function, and is, dependent on the architecture of the switch and local decisions on the strictness of QoS guarantees required by the switch. The other two algorithms, GCAC and shortest-path computation, are used by the ingress node receiving a connection setup request to determine a shortest-path hierarchical route for the connection while ensuring that all the links on the path have the available cell rate (bandwidth) requested for the connection. This form of routing, where the ingress node determines the shortest-path for the connection, is referred to as source routing. The PNNI v1.0 standard specifies two GCAC algorithms: simple GCAC and complex GCAC. Either of these algorithms can be used to determine if each link on a selected path has the requisite available cell rate (bandwidth) for the connection. The shortest path computation is essentially an execution of a shortest-path algorithm, such as Dijkstra's or Bellman-Ford's, with the link and node weights set to those of the metrics advertised in the received topology information.

Since PNNI networks are hierarchical, the shortest-path computed by the ingress node (after applying Dijkstra's algorithm and the GCAC available cell rate check algorithm) does not specify the exact set of switches through which the connection must be routed. Instead, it specifies a stack of Designated Transit Lists (DTLs), one identifying the physical switches in its peer group, and others identifying logical switches in higher-level peer groups. The DTLs are passed as parameters in the SETUP message. This eliminates the need for intermediate nodes (except border nodes of peer groups) to perform route selection. The border node of each peer group is involved in route selection since nodes outside a peer group P do not have a detailed picture of the topology and loading conditions of the peer group P. The border node through which the connection setup enters the peer group computes a DTL for its peer group and places this on the stack of DTLs as it propagates the PNNI SETUP message.

Once a path has been selected for the connection, each node on the path executes CAC (Connection Admission Control) to ascertain that it can admit the connection without violating guarantees for existing connections. Each node in the path needs to perform its own connection admission control because its own state may have changed since it last advertised its state with the network used for the GCAC at the ingress or border node.

If the connection admission control procedure is successful, each node then programs the switch fabric with channel identifier translation information and with information for user-plane algorithms, such as scheduling, UPC (Usage Parameter Control), traffic shaping, etc.

The signaling protocol is used to send a message from node to node to complete connection setup. Once a connection is set up, user data packets are forwarded through each node according to the channel identifier translation information. Since the route selection phase (executing shortest-path and GCAC algorithms) could consume a significant amount of time, route precomputation is suggested in Appendix H of the PNNI v1.0 specification. Precomputing routes could potentially speed up the route selection process. With precomputed paths, a connection setup request is handled by the ingress switch first determining the destination switch (logical node) through which to reach the called endpoint. If a precomputed route exists to the destination switch, the GCAC algorithm is applied to each link of the precomputed path to check for cell rate availability.

If this test passes, the route selection step is complete. If not, an "on-the-fly" route selection, consisting of both shortest-path and GCAC algorithm executions, is needed. Again, each node in the path needs to perform its own connection admission control because its own state may have changed since it last advertised its state within the network used for the GCAC at the ingress or border node.

The new services and reduced rates made possible by such peer groups of networks and nodes have been very attractive to users, but poorly-controlled delays and occasional failure of connectability have been drawbacks.

In the copending patent application of two of us with others, Ser. No. 09/188,023, filed Nov. 6, 1998, a dynamic programming method is disclosed for determining the length of a shortest path from a source node to any of v other nodes in the network with delay equal to an amount less than a specified time. A table is then built for such shortest-path routes for different specified delay times, so that a user may specify a maximum delay time as one of the requirements for quality of service. Because of the demands for computer time made by this method for large and complex networks, it is desirable to improve the method to be more efficient in use of computer time, particularly when the table must be supplemented by "on-the-fly" calculations.

SUMMARY OF THE INVENTION

According to the present invention, a more efficient delay-based path selection is provided in connection-oriented data networking. The connection-requesting user not only specifies a delay threshold T for the incoming request but also specifies a delay threshold tolerance $\epsilon$ within which the path delay should be satisfied. The method of the invention accesses stored values of the topology of the network and delay-related parameters for a set of links between different ones of the plurality of packet switches and provides to the user a delay-based shortest-path connection to one or more other users via at least one of said packet switches. The connection is provided by testing combinations of links by scaling the permissible delay threshold to a value $\tau$, appropriately chosen to ensure the user-specified delay threshold is satisfied to within the user-specified tolerance, correspondingly scaling the, delay measure on each link, and then truncating all the scaled values to integers, and accumulating the scaled link delays for the connection using a dynamic programming algorithm. The method exploits the new user specifications and computes paths from one source to all destinations in a coamputationally efficient manner.

In a first non-iterative implementation of the present invention, $\tau$ is set to min (T, (n−1)/$\epsilon$), where T and $\epsilon$ are respectively the delay threshold and the threshold tolerance specified by the user, and n is the number of nodes in the network. The dynamic programming algorithm computes Table L(v, $\tau$) and Table P(v, $\tau$), where L is the length of the path from a given node to node v and P encodes the shortest path from the given node to node v whose delay is no more than $\tau$. The method then computes the delays for each link in the original data for the topology of the network for each of the paths P(v, $\tau$) and store the delays in a table D(v). The algorithm provides outputs L(v, $\tau$) and D(v) and terminates.

The time complexity of this algorithm is min(ET, E(n−1)/$\xi$), and thus can be considerably faster than the dynamic programming algorithm used without scaling.

In a second implementation of the invention, which is the iterative scaling algorithm, the time complexity is further reduced to 4ED/$\xi$, where D is the maximum hop length of the optimal path, and E is the number of links in the network. The method of this implementation first sets $\tau = \tau_0$ (a small number <<T) and scales all of the link delays. The dynamic programming algorithm is then used to compute Table L(v,$\tau$) and Table P(v, $\tau$).

The method then computes the delays for each path P(v, $\tau$) using unscaled original link delays and stores the delays in a table D(v). If the condition exists that D(v)>T(1+$\epsilon$) and $2\tau$<n/$\epsilon$, set $\tau=2\tau$, rescale all delay parameter values, truncate them to integers, and recompute Table L(v,$\tau$) and Table P(v,$\tau$), else copy L(v,$\tau$) to L(v) and P(v,$\tau$) to P(v) and terminate.

The table calculated during the last iteration of DSA (Dynamic Scaling Algorithm) contains the constrained shortest paths.

The method according to either implementation of the present invention has two compelling advantages. It generates paths from one source to multiple destinations, an attribute that is critical in designing route caching algorithms that improve the grade of service. Further, it greatly improves computational speed.

Further features and advantages of the present invention, as well as the structure and operation of various embodiments of the present invention are described in detail below with reference to the accompanying drawing.

BRIEF DESCRIPTION OF THE DRAWING

The teachings of the present invention can be readily understood by considering the following detailed description in conjunction with the accompanying drawings, in which:

FIGS. 13A and 13B show a call setup procedure at a switch for a hierarchical network using routing data created according to FIGS. 7A, 7B, and 12;

DETAILED DESCRIPTION

A preferred embodiment of the invention will now be described while referring to the figures, several of which may be simultaneously referred to during the course of the following description.

The following technical background will be helpful in understanding the terminology that is definitive of the preferred implementations of the present invention.

Shortest-path algorithms are applied with additive metrics, while GCAC is applied with a non-additive metric. The question of whether maxCTD (maximum Cell Transfer Delay) and peak-to-peak CDV($\alpha$) (the $\alpha$ quantile of the Cell Delay Variation) are additive metrics or not, and hence whether they should be included in the shortest-path determination phase or GCAC phase has not been addressed. Appendix H of the PNNI v1.0 standard specification indicates that delay could be used in the shortest-path computation phase implying that it is an additive metric. Nevertheless, if a weighted average of CTD and AW metrics is used, the solution may not meet the end-to-end CTD constraint. This would require a second step to test whether the "shortest" path meets the end-to-end CTD requirement.

Furthermore, CTD has been identified as being a non-additive metric. Simply adding the CTD contributions from the switches on a path leads to a very pessimistic estimate of the end-to-end CTD.

Some of the delay metrics that could be used in implementing the present invention include the following. Cell Transfer Delay (CTD) is defined as the elapsed time between a cell exit event at the source UNI and the corresponding cell entry event at the destination UNI for a particular connection. The Cell Transfer Delay is, therefore, the sum of the total inter-ATM node transmission delay and the total ATM node processing delay in the path. Two end-to-end delay parameter objectives are negotiated: Peak-to-Peak CTD and maxCTD. Peak-to-peak CTD (Cell Transfer Delay) is defined as the cc quantile of the CTD minus the fixed CTD. The term peak-to-peak refers to the difference between the best and the worst case of CTD, Where the best case equals to fixed delay and worst case equals to a value likely to be exceeded with probability no greater than $(1-\alpha)$.

In the preferred implementation of the invention described hereinafter, dynamic scaling is applied facilitate the use of delay-based route selection to help satisfy quality-of-service standards. Dynamic scaling and truncating of scaled values to integers to shorten calculations is supported by the systems and techniques now to be described.

Figure 1:
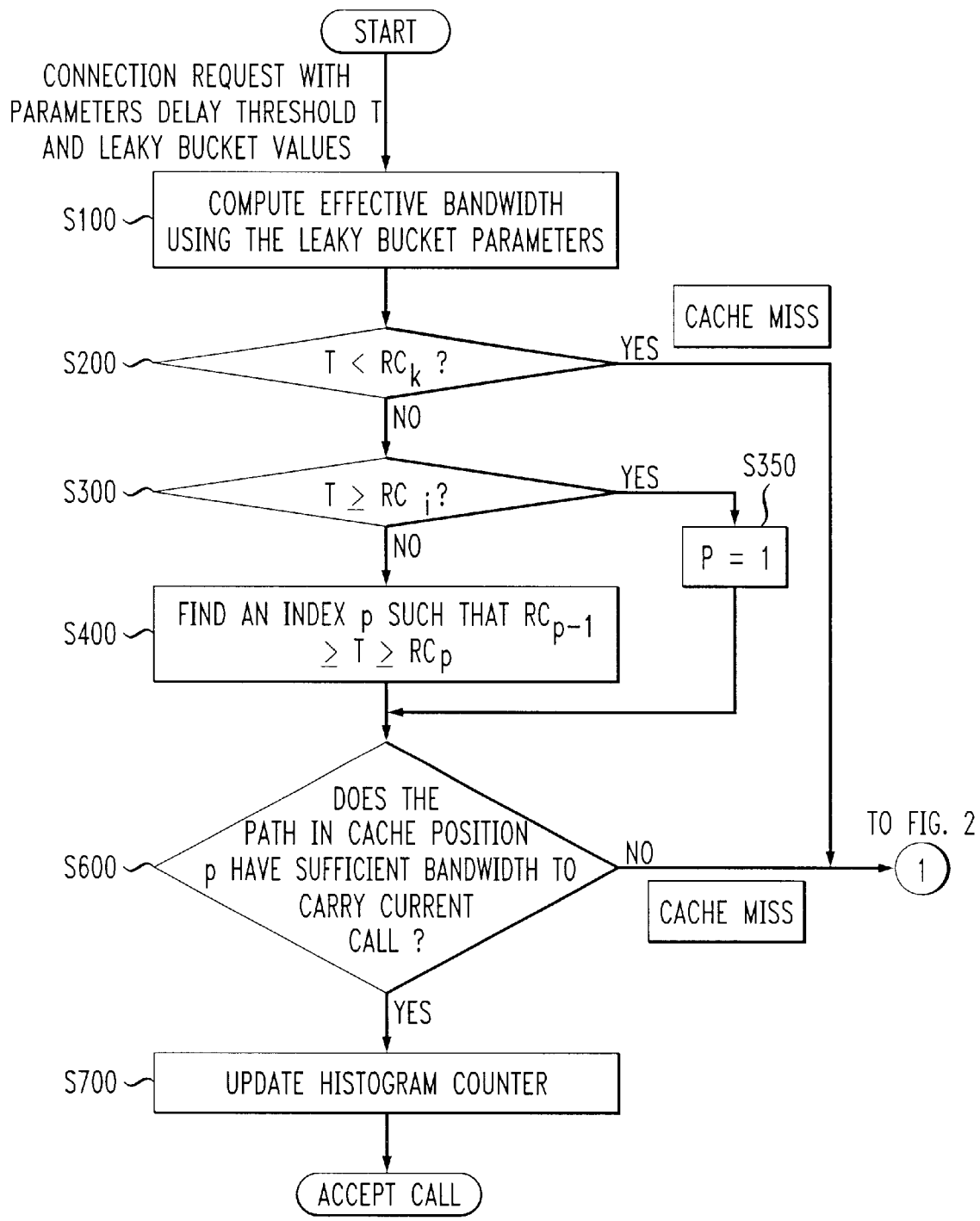
FIGS. 1 and 2 show separable parts of a flow diagram for the non-iterative scaling method according to the present invention.
Figure 2:
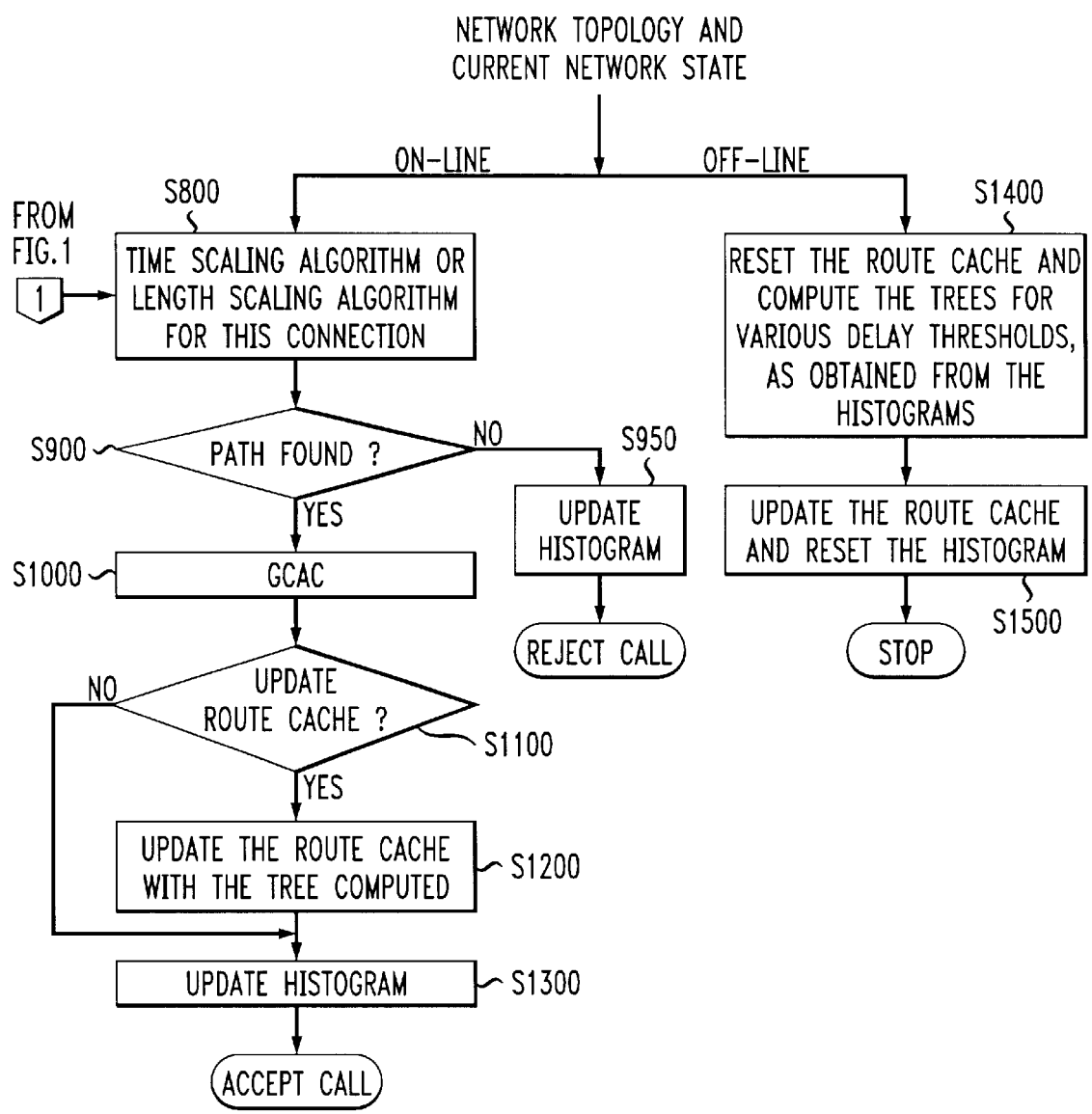

FIGS. 1 and 2 show separable parts of a caching algorithm used in scaling according to the present invention. This algorithm deals with a problem of computing constrained shortest paths from one source to multiple destinations. The algorithm provides for off-line route cache computation and on-line route computation. The K paths in the route cache for each destination are indexed by 1, 2, 3, k, ... K. Let $RC_k$ be the delay threshold of path k. The paths are ordered so that $RC_k > RC_{k+1}$, so that the paths are ordered in descending order of delay thresholds.

When a connection request arrives with the delay requirement of T and the traffic descriptors indicated as leaky bucket values, step S100 computes an effective bandwidth for the connection. This effective bandwidth is computed based on conservative assumptions to avoid the rejection of this call by the connection admission control of a downstream switch. Step S200 checks if T is $<RC_K$, the smallest cached delay. If 'yes' a cache miss results, and an on-line computation is needed. If 'no', a path is selected from the cache. In step S300, if $T >= RC_1$, the largest cached delay, then a running index p is set to 1 (step S350). Otherwise, in step S400 running index p is found such that $RC_{(p-1)} >= T >= RC_p$. In step S600, it is checked whether the path in cache position p has a larger bandwidth than the previously set required bandwidth. If 'yes', a cache hit results, the call is accepted, the connection is set up, and the counter for p is reset to zero (step S700). If 'no', a cache miss results, and, for either cache miss, the on-line calculation of FIG. 2 is required.

In FIG. 2, an initial decision must be made in step S800 whether the remaining time for calculation is so short that length scaling, without delay scaling, must be used, or whether the indicated delay scaling (here called time scaling) can be used. If so, step S800 includes the modification of the dynamic programming algorithm of FIG. 4A and 4B described below in connection with Equation 6. The most recent network topology information is used. If the result of the on-line calculation is that a path is found ('yes' in step S900), step S1000 invokes general connection admission control. Step S1100 determines whether the characteristics of the call meet the criterion according to the collected histogram for inclusion into the route cache. If a Route Cache Hit Ratio (CFR) is defined as the fraction of cache look ups that find a path to the desired destination and if the Cache Path Success Ratio (CPSR) is defined as the fraction of times the path in the route cache passes the bandwidth test, then the real-time budget for on-line computation is $$\frac{1.0}{\text{Call rate} * (1.0 - CHR) * (1.0 - CPSR)} \qquad (4)$$

If the delay scaling algorithm's complexity is less than the real-time budget, it is chosen because of its desirable property of computing paths to all destinations. Otherwise, the length scaling algorithm is used. It can also be used if the characteristics of the call are rare or there is a destination correlation.

Step S1100 gives a 'yes' answer if delay scaling is used for the on-line calculation and if the collection of just-calculated paths meet a pre-existing policy for updating. If 'yes', the route cache is updated (step S1200), the counter reset (step S1300), and the call accepted. Even if the cache is not to be updated, the counter is reset, and the call accepted.

With respect to steps S900 and S1000, if a path is not found or in the case that GCAC fails (not shown), step S950 updates the computation histogram (the p counter is reset), and the call is rejected.

FIG. 2 also shows steps S1400 and S1500 for updating the route cache off-line, based on changing network topology and current network state. The updating would be done so as not to interfere with on-line computations.

According to separate aspects of the present invention, both a method and an apparatus include such delay metrics in the route selection process, implemented with improved efficiency according to the present invention, in either cases implemented to satisfy FIG. 1 and FIG. 2.

The scaling and truncating aspect of the invention, as implicit in step S800 of FIG. 2, will now be further explained with reference to FIG. 3.

Figure 3:
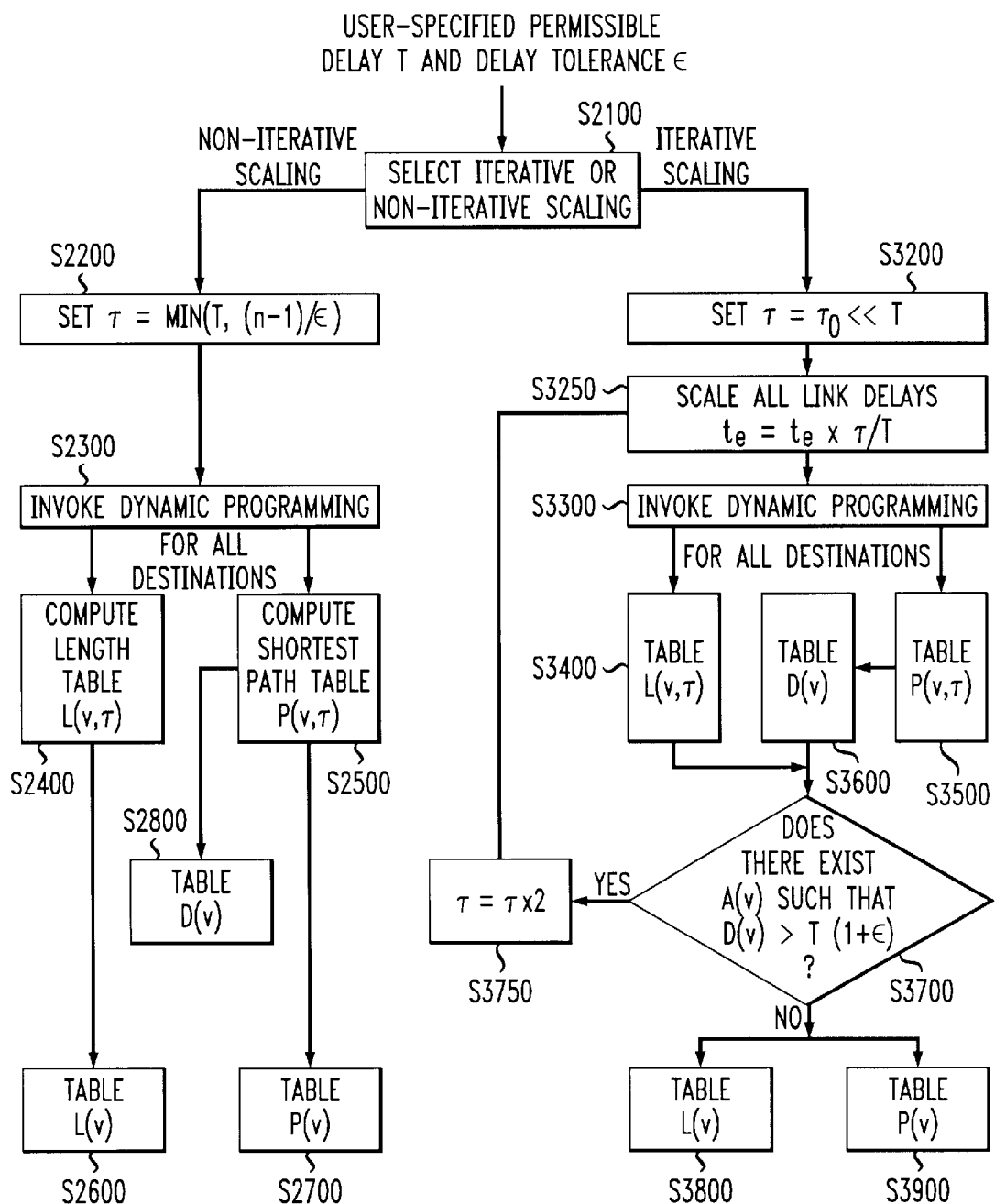
FIG. 3 shows a flow diagram including selection between iterative and non-iterative scaling, with the steps for each, and also illustrates the truncating aspect of the invention.

In FIG. 3, step S2100 selects iterative or non-iterative scaling, for example, based on prior experience with the type of connection requested.

If non-iterative scaling is selected, step S2200 sets $\tau$ to min $(T, (n-1)/\epsilon)$ and, in step 2300, the dynamic programming algorithm runs. In step 2400 it computes Table $L(v, \tau)$, and in step 2500 it computes Table $P(v, \tau)$, where L is the length of the path from a given node to node v and P encodes the shortest path from the given node to node v whose delay is no more than $\tau$. In step 2800, the method then computes the delays for each link in the original data for the topology of the network for each of the paths $P(v, \tau)$ and store the delays in a table $D(v)$. For the totaled values of the scaled, truncated, and accumulated delay parameter that satisfies the above condition, step 2600 copies $L(v, \tau)$ to output $L(v)$ and step 2700 copies $P(v, \tau)$ to output $P(v)$ and terminates.

In FIG. 3, in the iterative-scaling path, step 3200 sets $\tau=\tau_0$ (a small number $<<T$). Step 3250 scales all link delays according to $t_e=t_e \times \tau/T$. The dynamic programming algorithm is invoked in step 3300. Step 3400 computes Table $L(v,\tau)$ and step 3500 computes Table $P(v,\tau)$.

The method then computes the delays for each link in the original data for the topology of the network for each of the paths $P(v, \tau)$. Step 3500 stores the delays in a table $D(v)$.

If the condition exists that $D(v)>T(1+\epsilon)$ and $2\tau<n/\epsilon$, as tested in step 3700, step 3750 sets $\tau=2\tau$ and re-enters step 3250 to rescale all delay parameter values, truncates them to integers, and recomputes Table $L(v,\tau)$ and Table $P(v,\tau)$, else copy $L(v,\tau)$ to $L(v)$ and $P(v,\tau)$ to $P(v)$ and terminates.

The table calculated during the last iteration of DSA (Dynamic Scaling Algorithm) contains the constrained shortest paths.

A dynamic programming algorithm such as may be used in FIG. 3 will now be explained with reference to FIGS. 4A and 4B. This algorithm involves the additive delay accumulation method of the above-referenced copending patent application and is readily applied to the same parameters as the present invention. An overview is now given. A switch at an additional node to be connected in the path receives accumulated peak-to-peak CTD and adds its own contribution of the peak-to-peak CTD ($\alpha$) to the accumulated peak-to-peak CTD. This approach is based on estimating the end-to-end CTD ($\alpha$) as the sum of individual CTD ($\alpha$) values along the path from source to destination. If there are N switches along the path and if we denote the ($\alpha$) quantile of CTD in switch i by $CTD_i(a)$, then the total accumulated CTD is:

$$CTDtotal(\alpha) = \sum_{i=1}^{N} CTDi(\alpha) \qquad (1)$$

This simple method requires only one parameter, CTD, for its computation. The estimated CTD is always an upper bound of the actual CTD but it may be very conservative for connections that traverse many hops.

As described with reference to FIG. 4A through FIG. 13, this algorithm is not essential to the present invention, and could be replaced by another dynamic programming algorithm, but provides a useful tutorial for the reader.

Figure 4A:
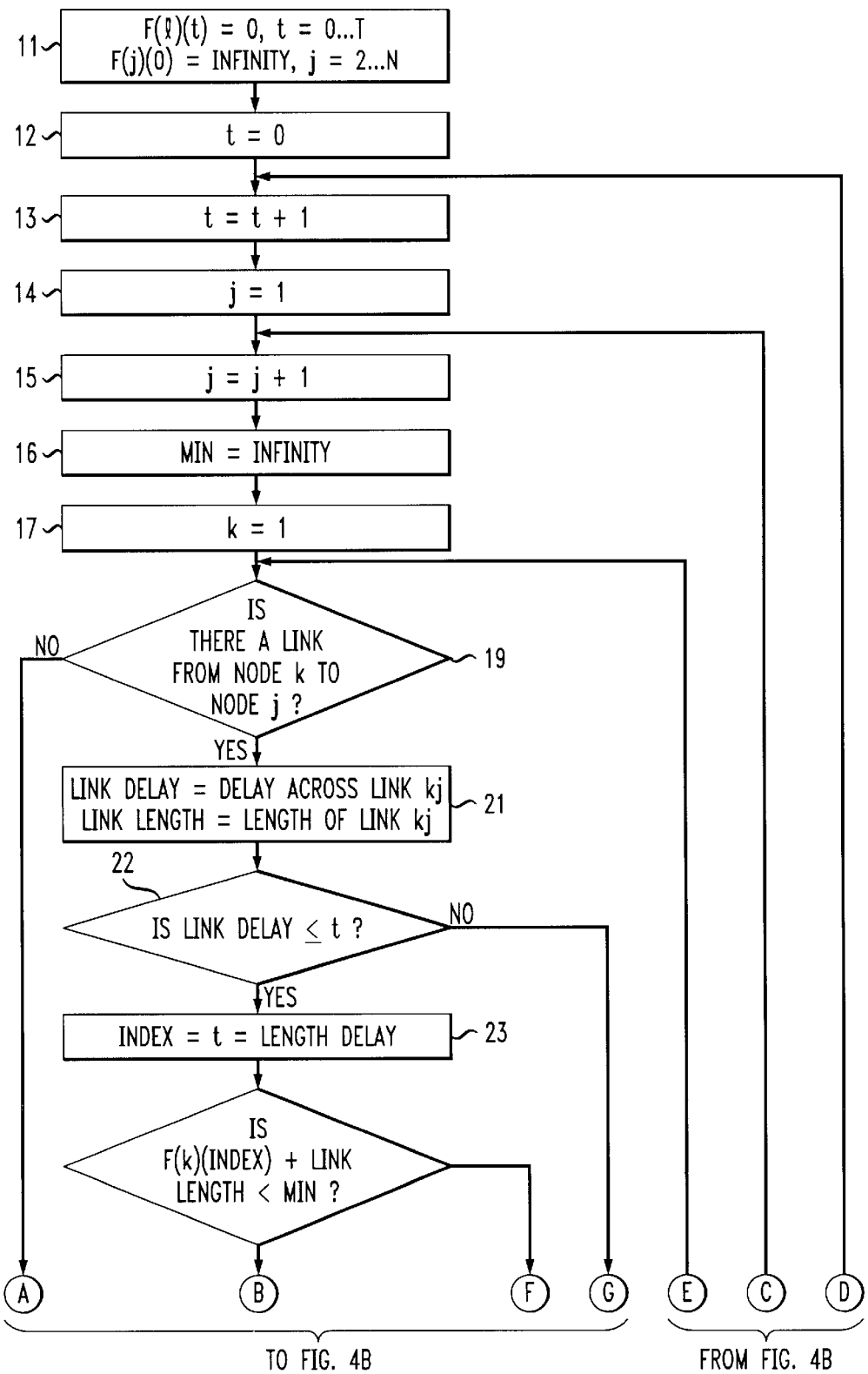
FIGS. 4A and 4B show an additive-delay-based path selection algorithm.
Figure 4B:
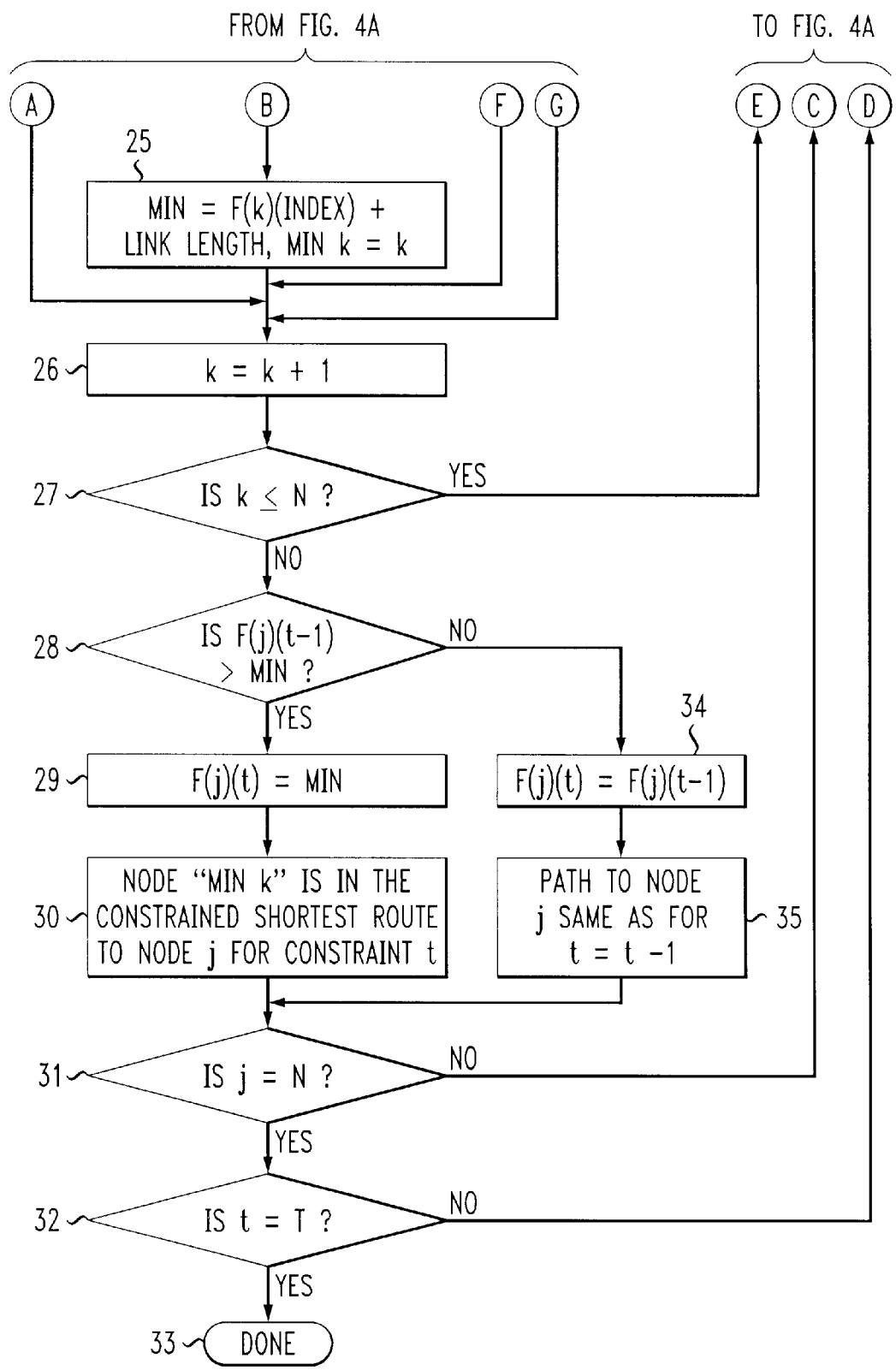

In more detail, with reference to FIGS. 4A and 4B, the constrained shortest path problem is solved using dynamic programming procedures assuming a discretized and bounded domain for the CTD and performing an exhaustive search over it.

Define $l_{ij}$ and $t_{ij}$ to be the AW and the CTD of the link that connects nodes i and j, respectively. Let T be an upper bound (delay constraint up to T) on the end-to-end CTD of any path in the network and $f_i(t)$ the length of a shortest path from node 1 to node i with CTD less or equal to t.

Step 11 in FIG. 4A includes the following steps: (See R. Hassin, *Approximation Schemes for the Restricted Shortest Path Problem*, Mathematics of Operations Research, Vol 17, No. 1, February, 1992, pp. 36–42.)

1. Initialize $f_1(t)=0$, $t=0, \ldots, T$
2. Initialize $f_j(0)=\infty$, $j=2, \ldots, N$, where the $\infty$ implies a number large enought that a sufficiently exhaustive search of possible links can be made.

Steps 12–17 represent the sequencing of variables in the following command:

3. Compute $f_j(t)=\min\{f_j(t-1),\min_{k|tkj \leq t}\{f_k(t-t_{kj})+l_{kj}\}\}$ j= 2, ..., N, t=1, ..., T Decision circuit 19 determines whether there is a link from node k to node j. In the latter event, step 21 retrieves link delay across link kj and link length from a topology data base for the peer group of networks (See FIG. 14.). So long as the retrieved link delay is greater than the previously accumulated value t, decision circuit 22 allows the process to increment k (Step 26).

As seen in the lower part of FIG. 4A, index circuit 23 and decision circuit 24 allow the process to increment k if a function of the index and the linklength is not less than a prescribed value MIN. If the function is less that MIN, MIN is set equal to the function, at Step 25. Then, and also by repeat of steps 19–25 when k becomes greater than N (decision circuit 27), decision circuit 28 tests whether f(j)(t−1) is greater than MIN. If it is, then f(j)(t) is equal to MIN (Step 29); and node min k is in the path to node j (step 30). If not, then f(j)(t) is set equal to f(j)(t−1)(step 34).

If delay has not reached the maximum T, then step 31 of the process allows t to increment. If delay has reached T, step 32 tests whether j has, reached N. If not, j is incremented. If j has reached N, the process is stopped (Step 33).

The complexity of the above algorithm is O(n1T), with i and 1 the number of nodes and links in the network, respectively. Compare this with Dijkstra's algorithm, of $O(n^2)$. It is shown in the above-referenced copending patent application that the constrained shortest path algorithm is consistently slower than Dijkstra's algorithm and does not scale well for large and dense networks. The configuration of FIG. 14 uses it only for "precomputations", where these considerations are not a problem, rather than "on-the-fly" computations.

The delay scaling method according to the present invention attempts to balance a tradeoff between scaling down the delay requirement and the inaccuracy introduced by truncating scaled delays to integers. Specifically, whenever the delay metric is scaled by multiplying the delay of each link by a factor of $\tau/T$ and then truncating to an integer, a shortest path of delay no greater than $\tau$ is equivalent to delay no greater than $$T(1+(n-1)/\tau)$$

obtained according to the method of the above-cited copending patent application. The introduction of the increment $(n-1)/\tau$ is due to the truncating to an integer for up to $(n-1)$ links.

As set out in the above-cited application, the delay-scaling algorithm DSA (G, T, $\epsilon$), defined below, finds an approximate solution to the constrained shortest path problem.

More specifically, it returns a tree rooted at node 1 with the following preperties:

1. The length of the path from 1 to any other node v on this tree is no more than the length of the shortest path from 1 to v satisfying the delay constraint T.
2. The delay of the path from 1 to v is no more than T(1+$\epsilon$).

For a Graph G of two variables to be mutually optimized, that is, path length (or network cost) and connection delay, to be specified by a user, the following can be demonstrated.

Refer back to the above-description of FIG. 1. A $\tau$-scaling $G_\tau$ of Graph G is obtained by multiplying the delay on each edge in G by $\tau/T$ and then truncating the new delay to an integer. The corresponding delay constraint for the new scaled graph is $\tau$.

The algorithm DSA is implemented on a digital central processing unit as follows:

ALGORITHM DSA—ITERATIVE METHOD
Inputs
  Graph G with edge weights $l_e$ and $t_e$
  Delay constraint T
  Relative error $\epsilon$
  Auxiliary algorithm DAD, a dynamic programming algorithm based on delays, illustratively, the algorithm of the above-referenced copending patent application.

Outputs
  Table L(v), $1 \leq v \leq n$; the L(v) entry being the length of the shortest path for 1 to v whose delay is no more than T(1+$\epsilon$).
  Table P(v), $1 \leq v \leq n$; the entry P(v) encoding the actual shortest path, from 1 to v whose delay is no more than T(1+$\epsilon$) and whose length is given by L(v).

Steps
  1. Set $\tau = \tau_0$ (a small number <<T).
  2. Call DAD $(G_\tau, \tau)$ to compute Table L(v,$\tau$) and Table P(v,$\tau$).
  3. Compute the delays in the original graph G, for each of paths P(v, $\tau$) and store the delays in D(v).
  4. If $\exists v \in G$: such that D(v)>T(1+$\epsilon$) and $2\tau < n/\epsilon$, set $\tau = 2\tau$ and go to step 2 else copy L(v,$\tau$) to L(v) and P(v,$\tau$) to P(v) and terminate.

The table calculated during the last iteration of DSA contains the constrained shortest paths. It can be shown that the worst case complexity of the algorithm is 4ED/$\epsilon$, where D is the maximum hop length of the optimal path, and E is the number of inks in the network. Clearly D<n. The worst case running time of this algorithm is independent of the delay/length values and, hence, this algorithm scales well as these values change. Further, a single invocation of DSA finds the constrained shortest path from the source to all destinations.

The following observations about DSA are significant:

The time complexity result has a value D, but the algorithm does not need to know this value.

As mentioned earlier, a slightly weaker time complexity result is 4En/$\epsilon$, but in most real-life cases when the paths have a hop-count restriction (for example, 5), a tighter complexity result is order(s) of magnitude better than the weaker result. DSA has a monotonicity property that is useful in practice. The accuracy of the solution monotonically improves with successive iterations. DSA can be terminated in the middle and still produce reasonable answers. For instance, when there is a call processing time budget during call setup, the execution can be terminated when time runs out, and a reasonably accurate solution will still be obtained. This monotonicity property does exist in the method of the above-referenced copending application or in other prior art methods seeking constrained shortest path results.

DSA is strongly polynomial, i.e., the running time bound does not depend on the actual delay and the length values. In contrast, the method of the above-referenced copending application or the other prior art methods seeking constrained shortest path results are pseudo polynomial and should be considered less robust.

Figure 5:
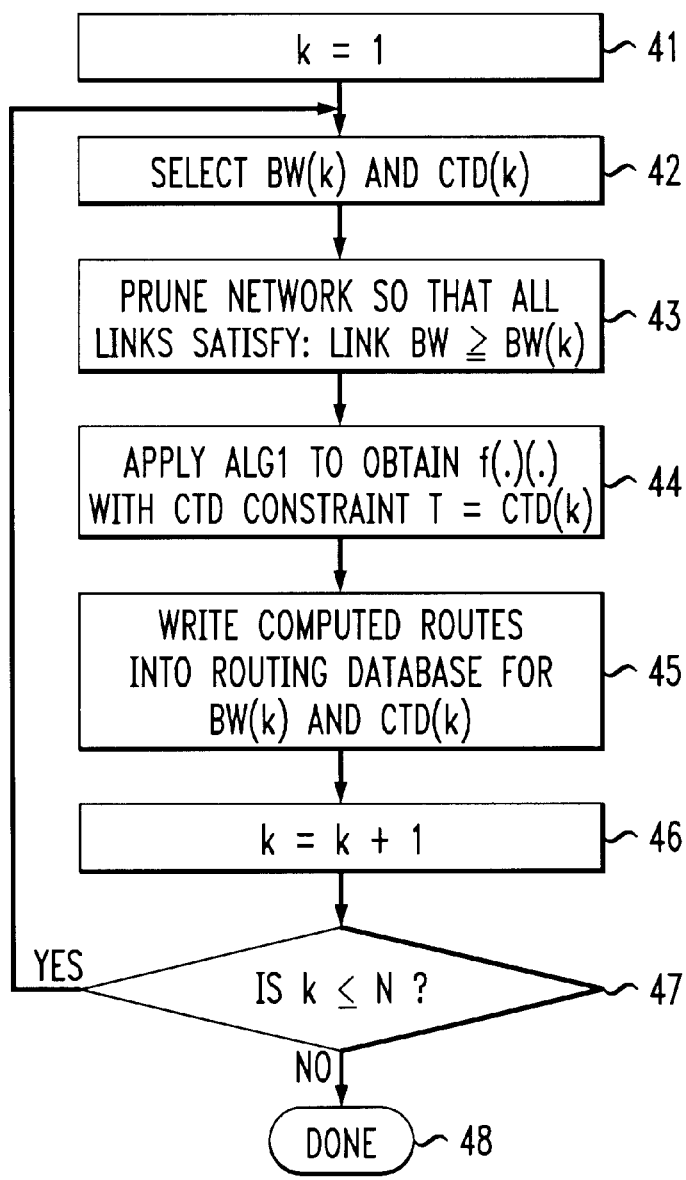
FIG. 5 shows a flow chart for the precomputation of routing tables in a flat network using the algorithm of FIGS. 4A and 4B.

As shown in FIG. 5, the algorithm of FIGS. 4A and 4B is used in the precomputation of routing tables in a flat (non-hierarchical) network. The flow diagram of FIG. 5 basically implements precomputation of "shortest path" routes using the shortest path algorithm described above and stores the routes for different values of CTD (or t) in a routing table or cache memory (See FIG. 14). Store the path(s) in a cache of the form (Traffic descriptor, CTD, route).

In more detail, in FIG. 5, the precomputation of routing tables starts with the selection of one (e.g., k=1) of the numbers and sizes of bandwidths (BW(k)) and cell delay variation (CTD(k)) options available for interconnection in the network. Thus, step 41 sets k=1, and step 42 selects BW(k) and CTD(k).

Step 43 then prunes the search of the network so that only links having bandwidth greater than BW(k) are investigated.

Step 44 applies the algorithm of FIGS. 4A and 4B to find the shortest paths f satisfying the CTD(k) requirement from the node in which this algorithm is being executed to all other nodes in the network. Step 45 writes the result into the routing table. As indicated in steps 46–48, this procedure is repeated for each available bandwidth and cell delay variation that may appear in a call setup request.

Figure 6:
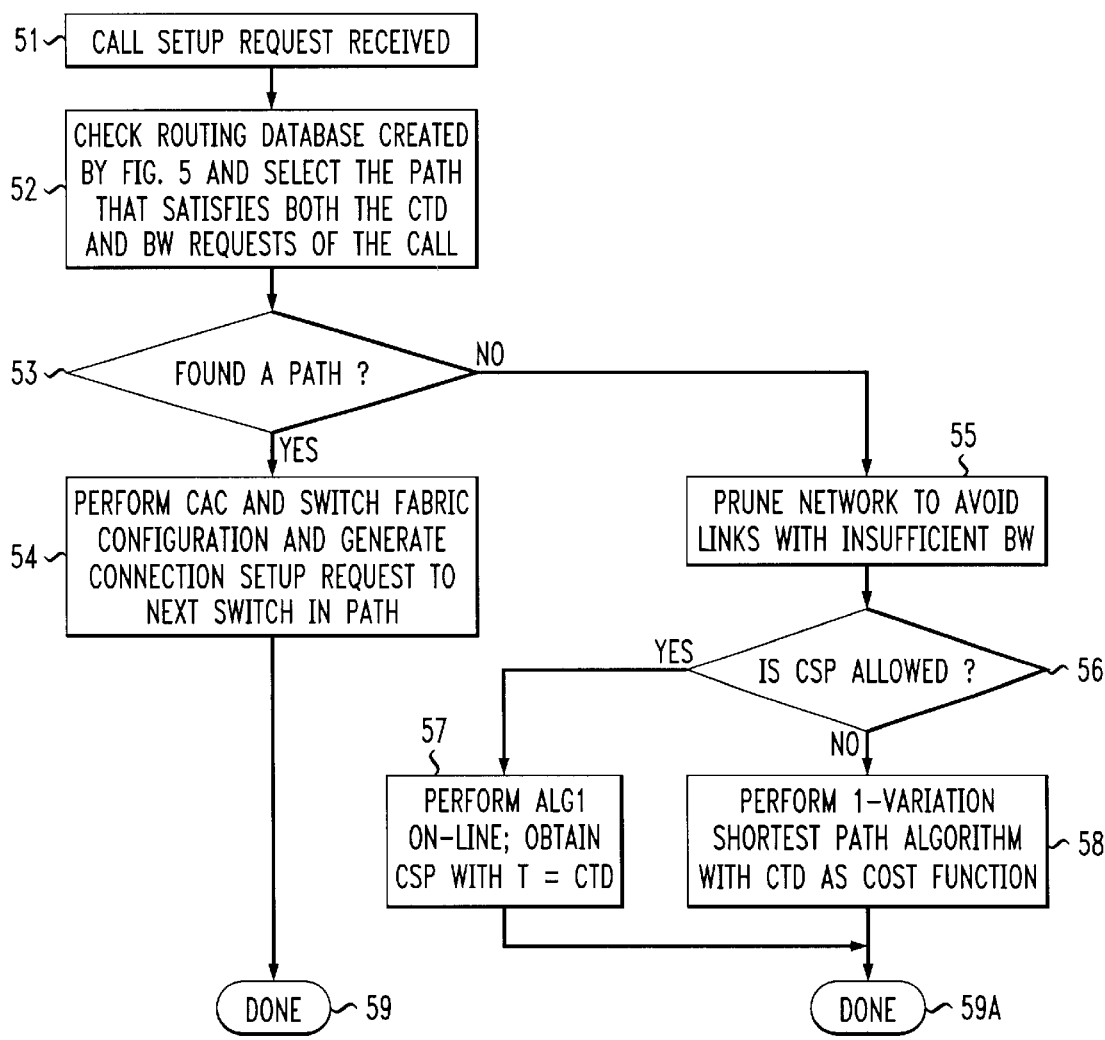
FIG. 6 shows a call setup procedure at a switch for a flat network using routing data created according to FIGS. 4A, 4B, and 5.

FIG. 6 illustrates the call setup procedure invoked by a call setup request (Step 51) in a flat network.

When the call setup request arrives at a switch (See FIG. 14), step 52 selects an optimal path from the table of precomputed routes that satisfies both the CTD and BW constraints in the call setup request.

Step 53 checks whether a path was found. If so, in step 54, call admission control and switch configuration are performed, and a connection setup request to the next switch in the path is generated. If not, an on-the-fly procedure, starting at step 55, is invoked to find an appropriate path. Step 55 prunes the search so that network links with insufficient bandwidth to satisfy the call setup request are not searched. Before the on-the-fly search is actually commenced, step 56 employs a decision circuit to decide whether the use of the constrained shortest path algorithm of FIGS. 4A and 4B is allowed. The answer is "Yes" if its use is judged to be not too expensive in terms of time and resources. Then step 57 uses the algorithm of FIGS. 4A and 4B in real time. Otherwise the answer is "No", and step 58 performs a Dijkstra shortest path algorithm with cell delay variation as the cost function. Once a path is found, the procedure is ended (step 59).

The second delay-based path-selection algorithm of the above-cited prior application employs delay accumulation calculated by the so-called asymptotic method. This is an existing measure that has heretofore been used, for other purposes. It uses both mean and variance of transfer delay, and the actual delay variation in each switch, in order to compute the end-to-end CTD. The intuition behind this is the central limit theorem. Irrespective of the distributions of individual random variables are, the sum of the random variables is normally distributed as N gets large. The error is compensated by adding the maximum difference between the estimate and actual CTD in the switches along the path. The end-to-end CTD over N switches, assuming independent delays in the switches, is given by:

$$CTD\ total\ (\alpha) = \sum_{i=1}^{N} \mu_i + \sqrt{\sum_{i=1}^{N} \sigma_i^2} \times t(\alpha) + \max_{1 \leq i \leq N} \{CTD\ i(\alpha) - (\mu_i \quad (2)$$

where, $t(\alpha)$ denotes the a quantile of standard normal distribution, $\mu_i$ denotes the mean delay in switch i, and $\sigma_i$ denotes the standard deviation of delay in switch i. The quantity $$d(\alpha) = \{CTDi(\alpha) - (\mu i + \sigma i \times t(\alpha))\} \quad (3)$$

is referred to as discrepancy, $d(\alpha)$. This method is also an upper bound of the actual CTD but the bound is much tighter when compared with the additive method. The asymptotic method requires each switch to report four parameters: mean queuing delay ($\mu$), variance of queuing delay ($\sigma$), discrepancy parameter $d(\alpha)$, and fixed delay f.

Figure 7A:
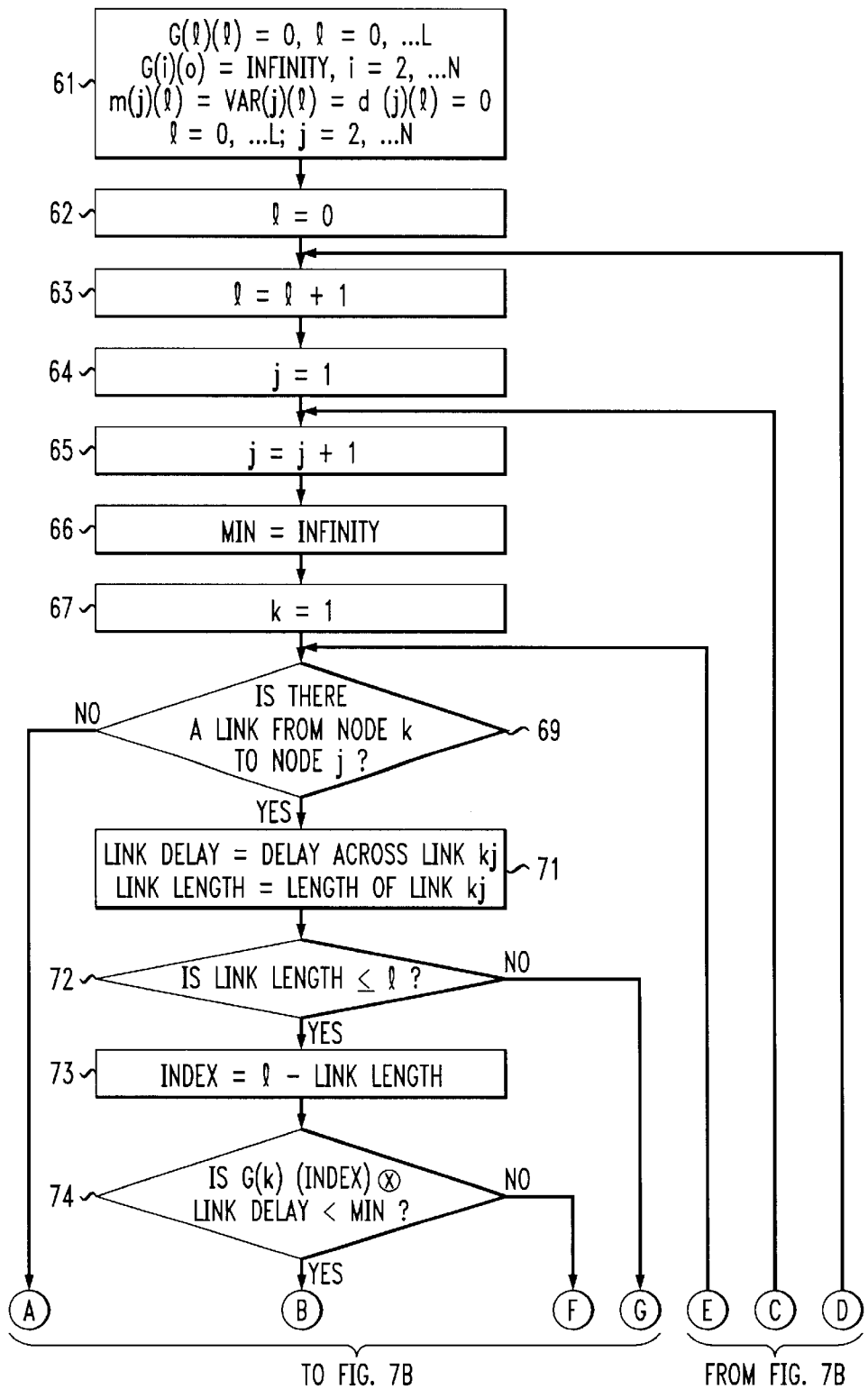
FIGS. 7A and 7B show an asymptotic-delay-based path selection algorithm.
Figure 7B:
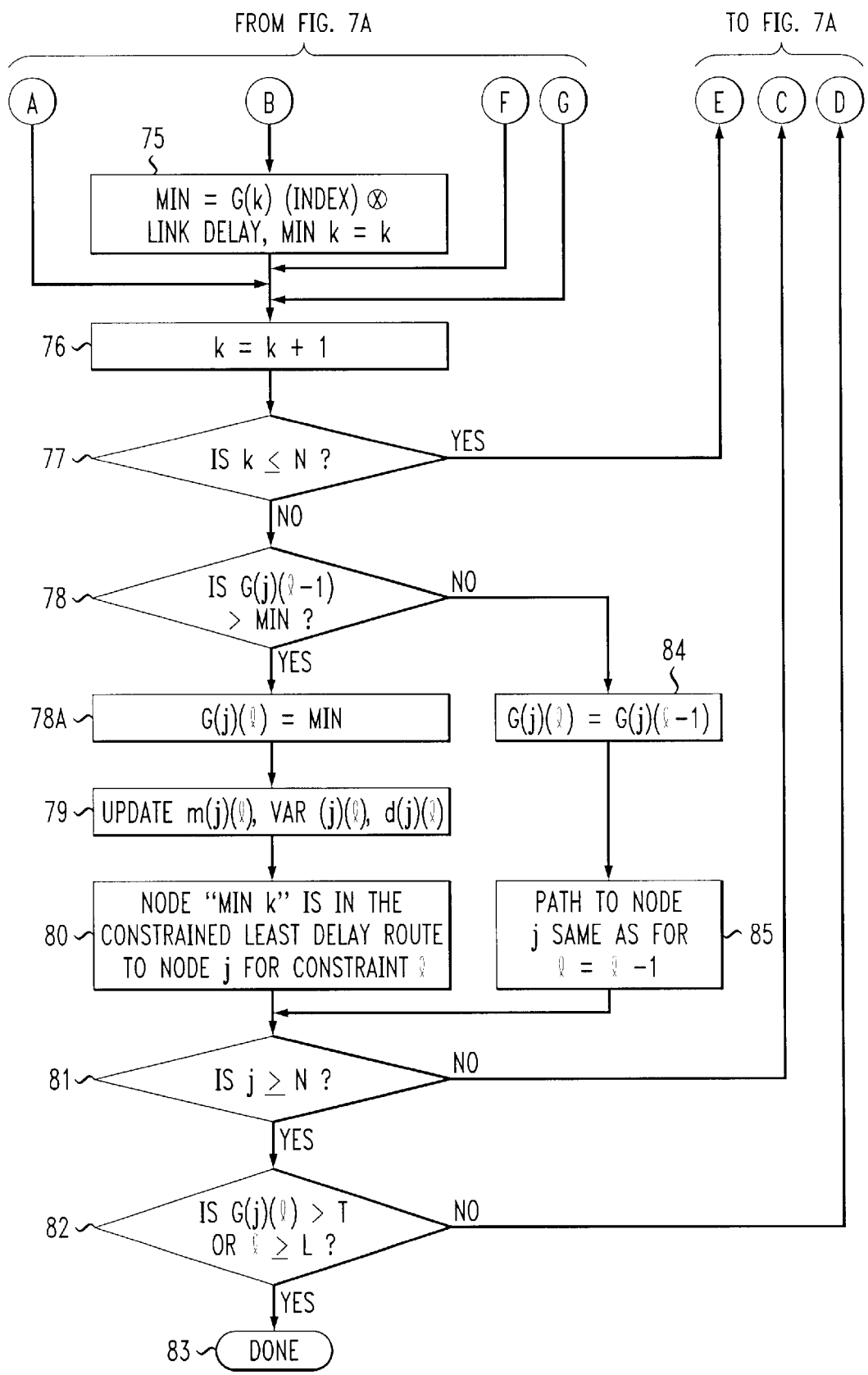

In an implementation of this approach, as set forth in FIGS. 7A and 7B, asymptotic-type delay accumulation is set forth in a algorithm that may be appreciated to be a variation of that of FIGS. 4A and 4B. The significant difference in the algorithm of FIGS. 7A and 7B as compared to that of FIGS. 4A and 4B resides in the use of the above four parameters. All other components and/or steps are the same or essentially similar to those in FIGS. 4A and 4B.

To modify the dynamic programming procedure for the constrained shortest path algorithm, proceed as follows: Define $l_{ij}$ and $t_{ij}$ the AW and the CTD of the link that connects nodes i and j, respectively. Let L be an upper bound on the end-to-end delay of any path in the network. Let also $g_i(l)$, $\mu_i(l)$, $\sigma_i^2(l)$ and $d_i(l)$ the CTD, the (cumulative) mean of the delay, the (cumulative) variance of the delay and the discrepancy of the delay of a shortest path from node 1 to node i with AW at most 1.

1. Initialize $g_1(l) = 0$, $l = 0, \ldots, L$
2. Initialize $g_j(0) = \infty$, $j = 2, \ldots, N$
3. Initialize $\mu_j(l)$, $\sigma_j^2(l) = d_j(l) = 0$, $l = 0, \ldots, L$, $j = 2, \ldots N$
4. Compute $g_j(l) = \min\{g_j(l-1), \min_{k|lkj \leq l} \{g_k(l-1_{kj}) \otimes t_{kj}\}\} j = 2, \ldots, N, =l1, \ldots, L$ With $g_k \otimes t_{kj}$ is $$\mu_k(l-l_{kj}) + \mu_{kj} + [\sqrt{\sigma_k^2(l-l_{kj}) + \sigma_{kj}^2}] \times t(\alpha) + \max\{d_k(l-l_{kj}), d_{kj}(\alpha)\} \quad (6)$$

defined as:

where $\mu_{kj}$, $\sigma_{kj}$, and $d_{kj}(\alpha)$ denote the mean, the variance and the discrepancy of link that connects nodes k and j.

In more detail, step 61 in FIG. 7A includes initialization of variables according to the four steps outlined above. Again, the $\infty$ implies a number large enough that a sufficiently exhaustive search of possible links can be made.

Steps 62–67 represent the sequencing of variables in the calculation of step 4 set out above. Decision circuit 69 determines whether a link exists from node k to node j. In the latter event, step 71 retrieves link delay across link kj and link length from a topology data base for the peer group of networks (See FIG. 14.). So long as the retrieved link length is greater than the previously accumulated value l, decision circuit 72 allows the process to increment k (step 76).

As seen in the lower part of FIG. 7A, index circuit 73 and decision circuit 74 allow the process to increment k if a function of the index and the link delay is not less than a prescribed value MIN. If the function is less that MIN, MIN is set equal to the function, at Step 75 (FIG. 7B). Then, and also by repeat of steps 69–75 when k becomes greater than N (decision circuit 77), decision circuit 78 tests whether G(j)(l–1) is greater than MIN. If it is, then G(j)(l) is equal to MIN (Step 79); and node min k is in the path to node j (step 80). If not, then G(j)(l) is set equal to G(j)(l–1) (Step 84).

Step 81 tests whether j=N. If not, j is incremented. In step 82, a decision circuit tests whether delay or length has reached a maximum. If not, l is allowed to increment (step 63 in FIG. 4A). If either has occurred, the process is stopped (Step 83).

Figure 8:
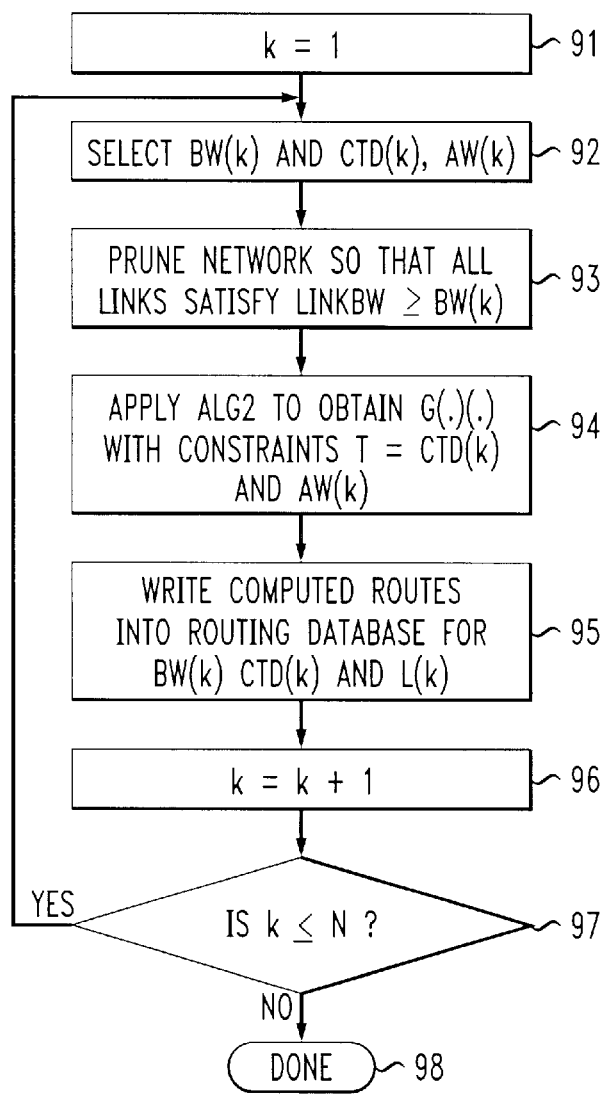
FIG. 8 shows a flow chart for the precomputation of routing tables in a flat network using the algorithm of FIGS. 7A and 7B.

As shown in FIG. 8, the algorithm of FIGS. 7A and 7B is used, according to the present invention, in the precomputation of routing tables in a flat (non-hierarchical) network. The flow diagram of FIG. 8 basically implements precomputation of "shortest path" routes using the shortest path algorithm described above and stores the routes for different values of CTD (or t) in a routing table or cache memory (See FIG. 14). Store the path(s) in a cache of the form (Traffic descriptor, CTD, route).

In more detail, in FIG. 8, the precomputation of routing tables starts with the selection of one (e.g., k=1) of the numbers and sizes of bandwidths (BW(k)), cumulative cell delay variation (CTD(k)), and cumulative administrative weightj (AW(k)) options available for interconnection in the network. Thus, step 91 sets k=1, and step 92 selects BW(k), CTD(k), and AW(k).

Step 93 then prunes the search of the network so that only links having bandwidth greater than BW(k) are investigated. Step 94 applies the algorithm of FIGS. 7A and 7B to find the shortest paths f satisfying the CTD(k) and AW(k) requirements from the node in which this algorithm is being executed to all other nodes in the network. Step 95 writes the result into the routing table. As indicated in steps 96–98, this procedure is repeated for each available bandwidth, cell transit delay, and administrative weight that may appear in a call setup request.

Figure 9:
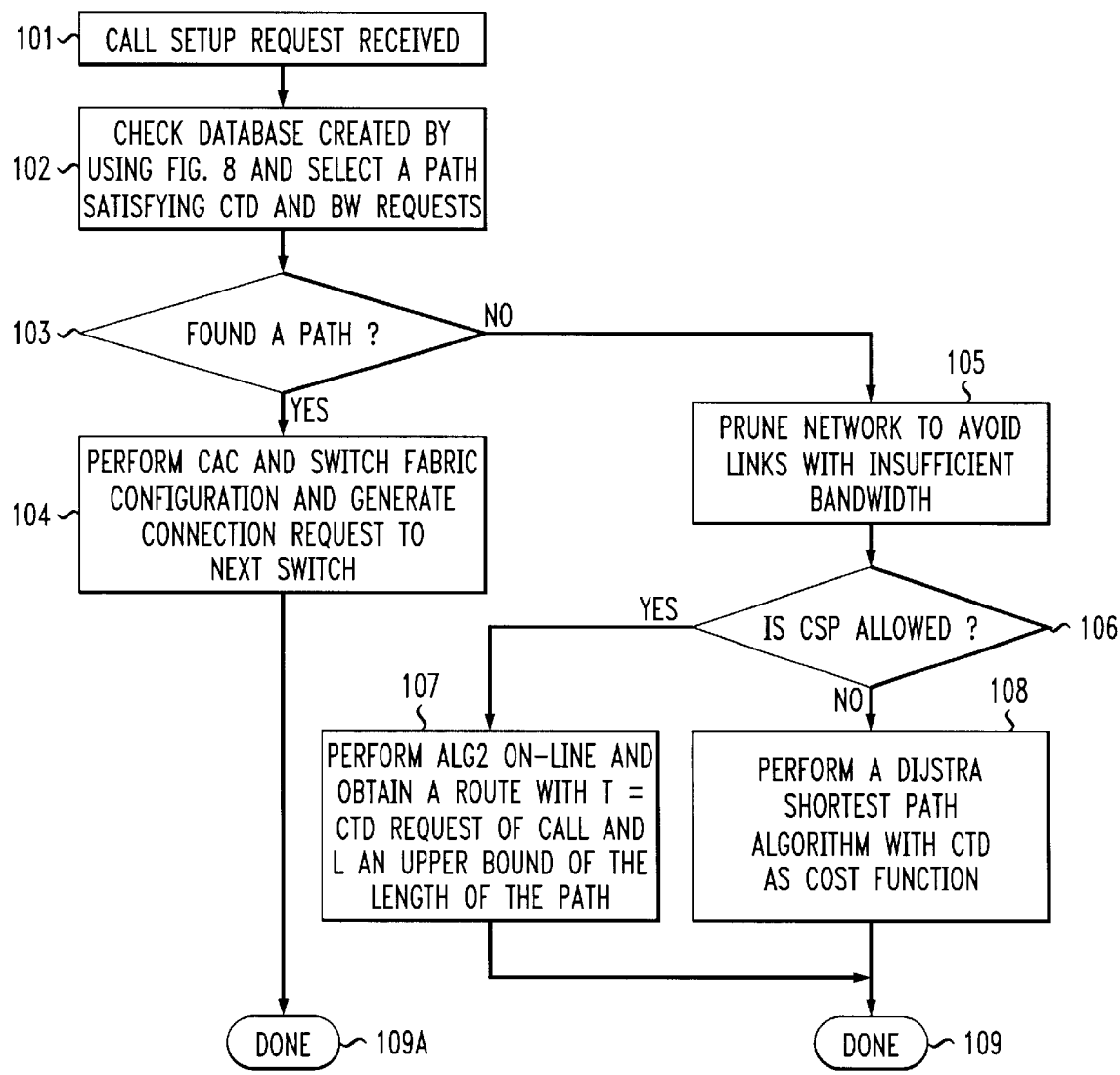
FIG. 9 shows a call setup procedure at a switch for a flat network using routing data created according to FIGS. 7A, 7B, and 8.

FIG. 9 illustrates the call setup procedure invoked by a call setup request (Step 101) in a flat network.

When the call setup request arrives at a switch (See FIG. 14), step 102 selects an optimal path from the table of precomputed routes that satisfies both the CTD and BW constraints in the call setup request.

Step 103 checks whether a path was found. If so, in step 104, call admission control and switch configuration are performed, and a connection setup request to the next switch in the path is generated. If not, an on-the-fly procedure, starting at step 105, is invoked to find an appropriate path. Step 105 prunes the search so that network links with insufficient bandwidth to satisfy the call setup request are not searched. Before the on-the-fly search is actually commenced, step 106 employs a decision circuit to decide whether the use of the constrained shortest path algorithm of FIGS. 7A and 7B is allowed. The answer is "Yes" if its use is judged to be not too expensive in terms of time and resources. Then step 107 uses the algorithm of FIGS. 7A and 7B in real time. Otherwise the answer is "No", and step 108 performs a Dijkstra shortest path algorithm with cell delay variation as the cost function. Once a path is found, the procedure is ended (step 109).

Figure 10:
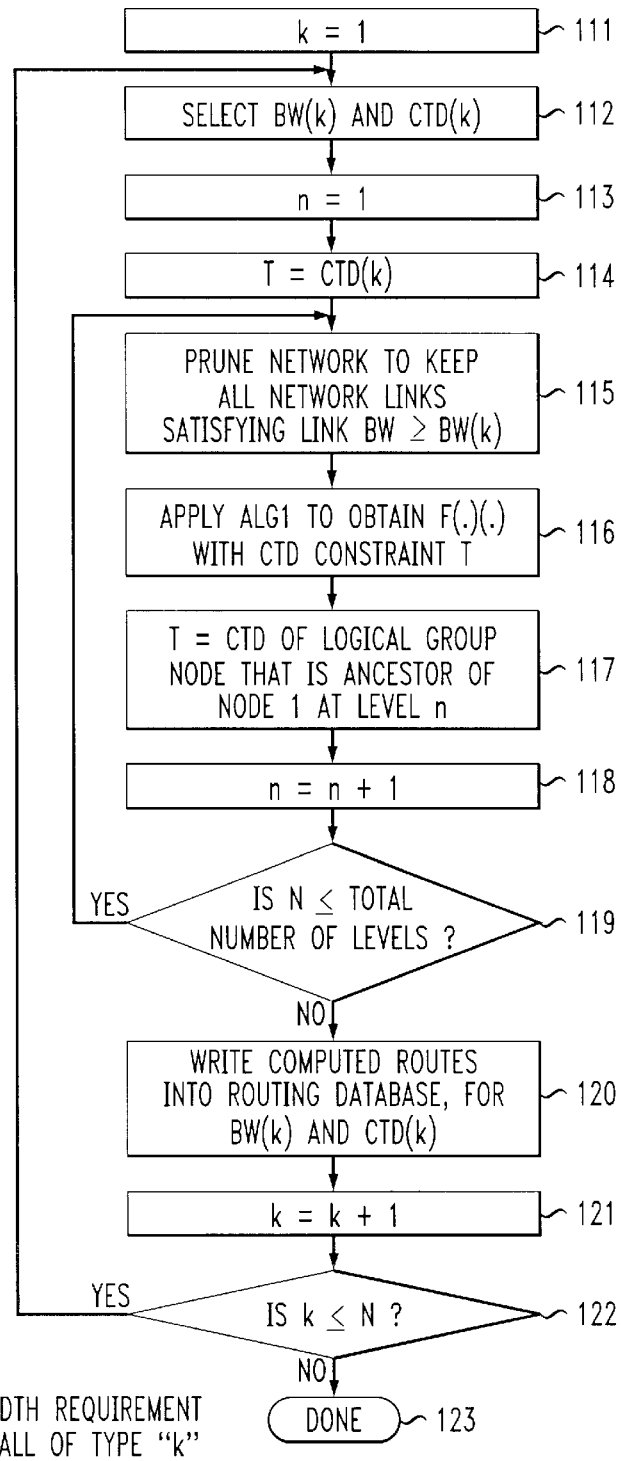
FIG. 10 shows a flow chart for the precomputation of routing tables in a hierarchical network using the algorithm of FIGS. 4A and 4B.
Figure 14:
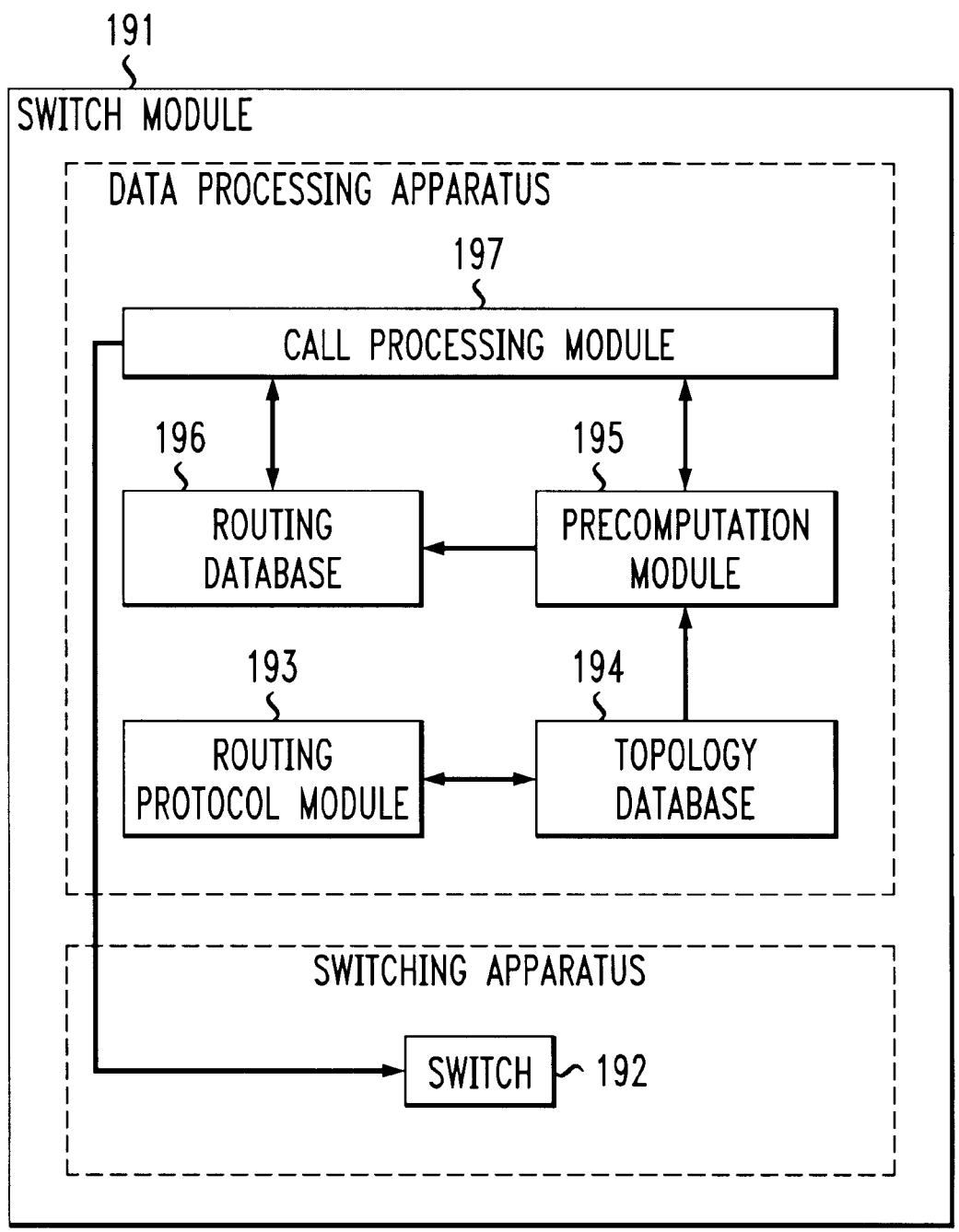
FIG. 14 shows a system diagram in block diagrammatic form for a hierarchical network using the PNNI telecommunications standard.

As shown in FIG. 10, the algorithm of FIGS. 4A and 4B is used in the precomputation of routing tables in a hierarchical network (see FIG. 14). The flow diagram of FIG. 10 basically implements precomputation of "shortest path" routes using the shortest path algorithm of FIGS. 4A and 4B and stores the routes for different values of CTD (or t) in a routing table or cache memory (See FIG. 14). Store the path(s) in a cache of the form (Traffic descriptor, CTD, route).

In more detail, in FIG. 10, the precomputation of routing tables starts with the selection of one (e.g., k=1) of the numbers and sizes of bandwidths (BW(k)) and cell delay variation (CTD(k)) options available for interconnection in the network. Thus, step 111 sets k=1, and step 112 selects BW(k) and CTD(k).

Step 113 sets n=1, representing the topmost level of the hierarchical network. Step 114 sets the maximum allowable amount T, according to the request, of the cumulative cell delay variation CTD(k).

Figure 15:
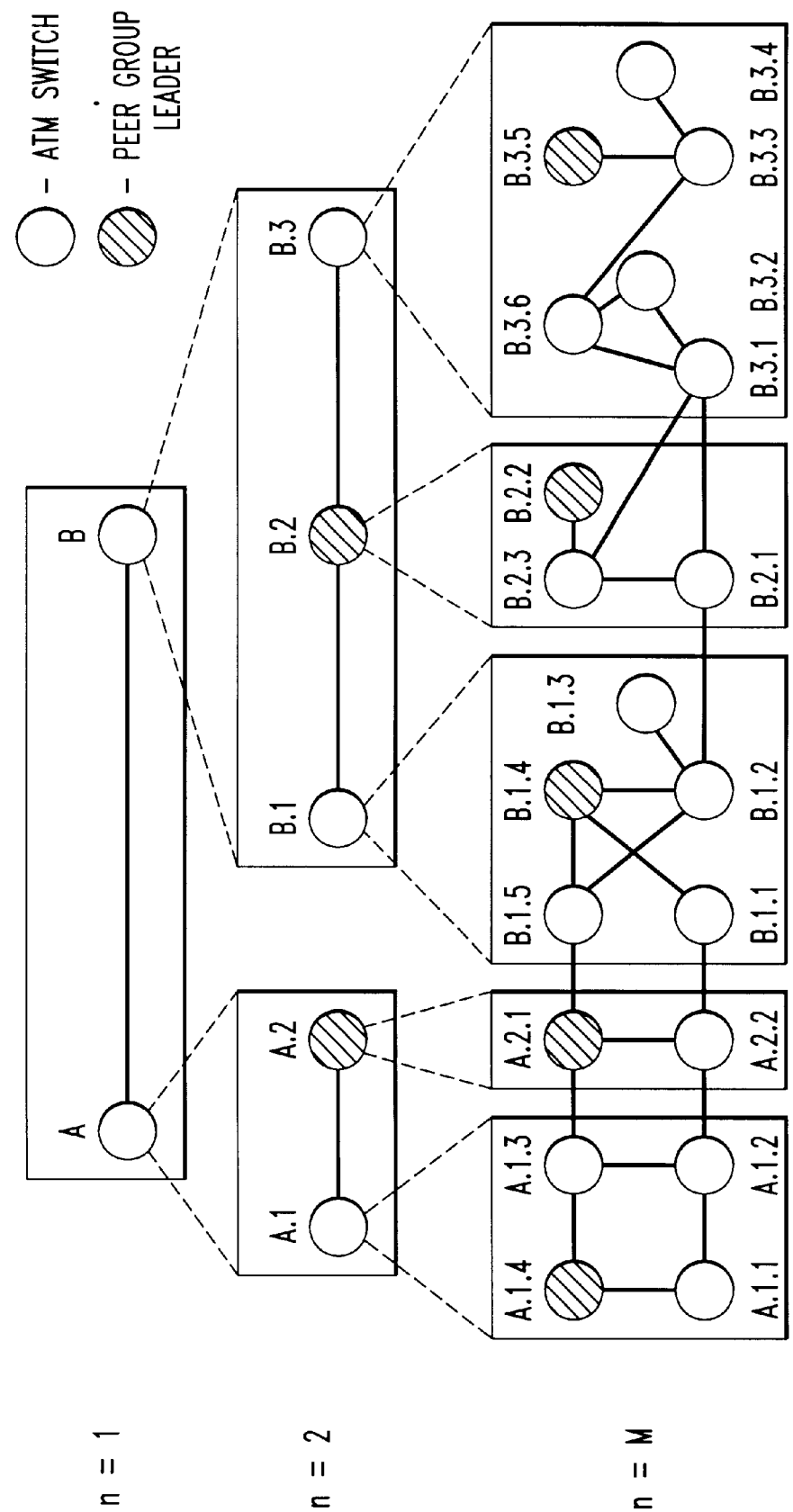
FIG. 15 shows a general description of a hierarchical telecommunication network.

Step 115 then prunes the search of the network so that only links having bandwidth greater than BW(k) are investigated. Step 116 applies the algorithm of FIGS. 4A and 4B to find the shortest paths f satisfying the CTD(k) requirement with constraint T from the node in which this algorithm is being executed to all other nodes in the peer group at level n. Step 117 sets T equal to the cell delay variation of the logical group node that is the ancestor (in level n, FIG. 15) of node I, which is the node handling the call setup request, at level n. Step 118 increments n to n+1; and step 119 uses a decision circuit to check whether n is less than or equal to the total number of levels (FIG. 15). If "yes", the process loops back to step 115 to perform route precomputation at each level of the hierarchical network. If "no", step 120 writes the computed routes into the routing database for BW(k) and CTD(k). As indicated in steps 121–123, this procedure is repeated for each available bandwidth and cell delay variation that may appear in a call setup request.

Figure 11A:
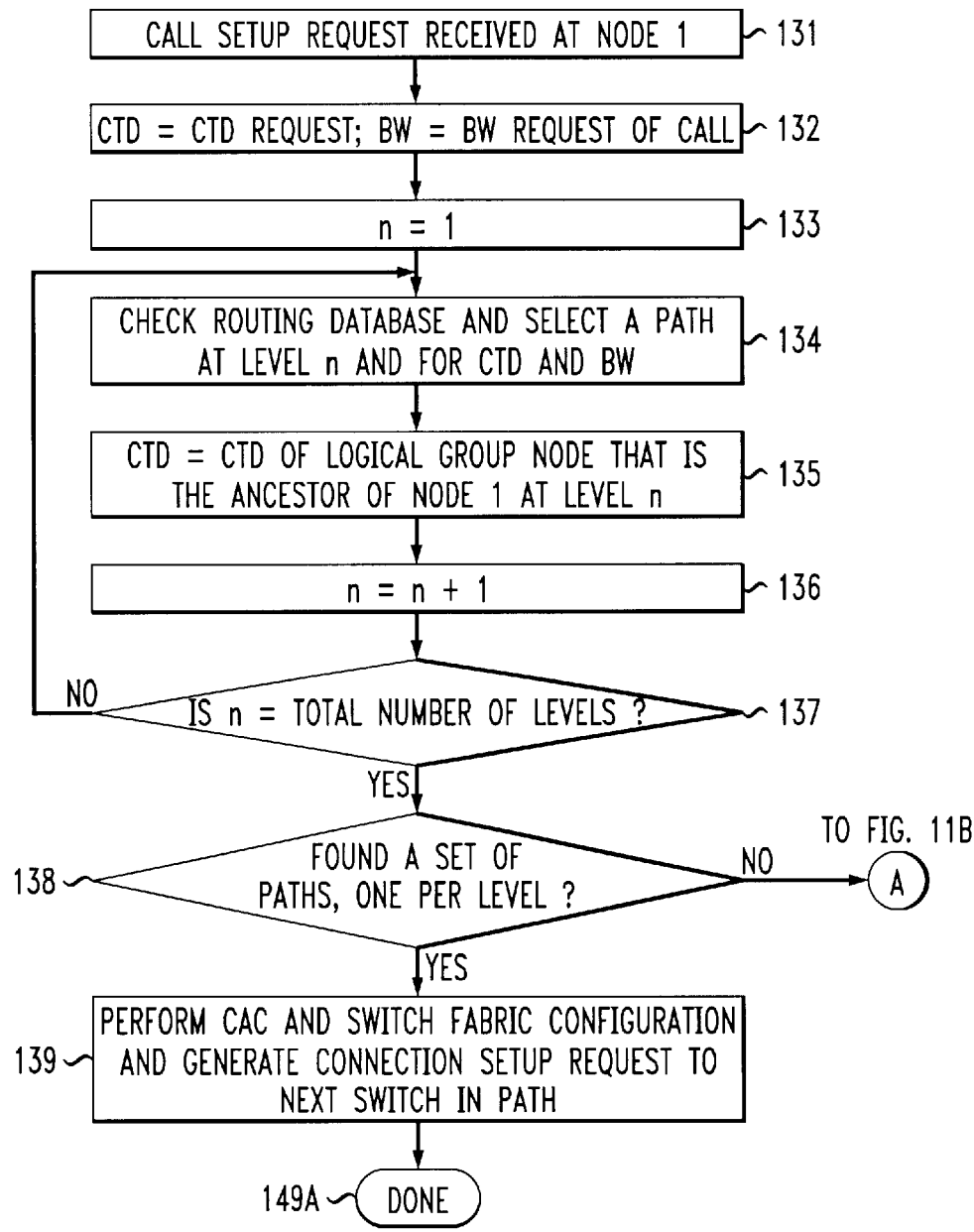
FIGS. 11A and 11B show a call setup procedure at a switch for a hierarchical network using routing data created according to FIGS. 7A, 7B, and 8.
Figure 11B:
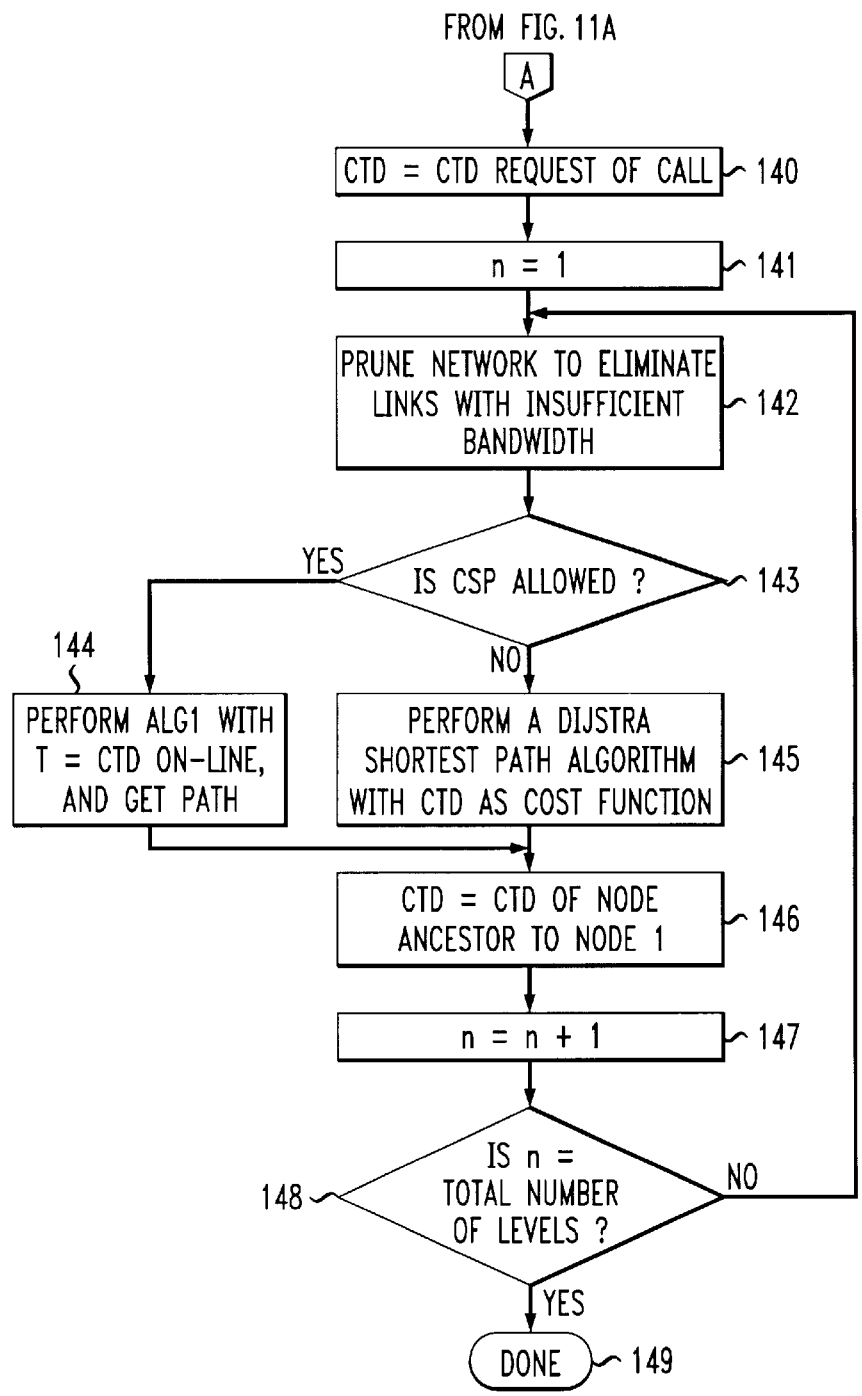

FIGS. 11A and 11B illustrate the call setup procedure invoked by a call setup request (Step 131) in a hierarchical network.

In FIG. 11A when the call setup request arrives at a switch (See FIG. 14), step 132 sets maximum cell delay variation and bandwidth equal to those specified in the call setup request. Step 133 sets n=1, representing the topmost level of the hierarchical network. Step 134 selects an optimal path through the peer group at level n from the table of precomputed routes that satisfies both the CTD and BW constraints in the call setup request.

Step 135 sets CTD equal to the CTD of the logical group node that is the ancestor of node I at level n. Step 136 increments n to n+1; and step 137 uses a decision circuit to test whether n is equal to the total number of levels. If "no", the process returns to step 134. If "yes", at step 138 a decision circuit checks whether a set of paths, one per level, was found. If so, in step 139, call admission control and switch configuration are performed, and a connection setup request to the next switch in the path is generated, the process being done, as indicated at 149A, at the current switch.

If a set of paths was not found, an on-the-fly procedure, starting at step 140 in FIG. 11B, is invoked to find an appropriate path. Step 141 resets n to 1. Step 142 prunes the search so that network links with insufficient bandwidth to satisfy the call setup request are not searched. Before the on-the-fly search is actually commenced, step 143 employs a decision circuit to decide whether the use of the constrained shortest path algorithm of FIGS. 4A and 4B is allowed. The answer is "Yes" if its use is judged to be not too expensive in terms of time and resources. Then step 144 uses the algorithm of FIG. 4A and 4B in real time. Otherwise the answer is "No", and step 145 performs a Dijkstra shortest path algorithm with cell delay variation as the cost function. So that a set of paths through peer groups at all levels may be found, step 146 sets CTD equal to CTD of the logical group node that is the ancestor of node I at level n. Step 147 increments n to n+1. Step 148 uses a decision circuit to check whether n has reached the total number of levels. If not, the process is returned to step 142. Once a complete set of paths is found, the procedure is ended (step 149).

Figure 12:
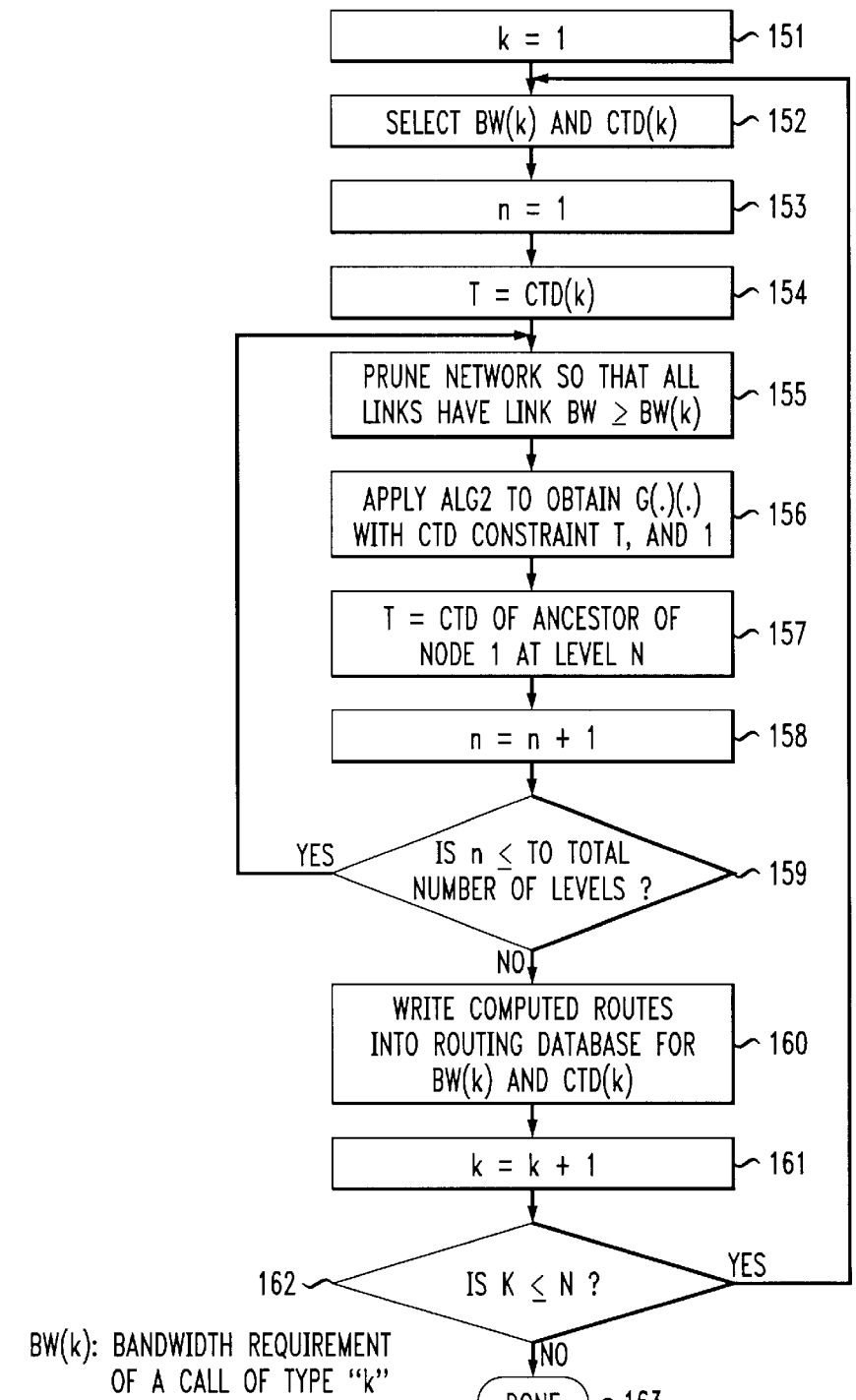
FIG. 12 shows a flow chart for the precomputation of routing tables in a hierarchical network using the algorithm of FIGS. 7A and 7B.

As shown in FIG. 12, the algorithm of FIGS. 4A and 4B is used, according to an asymptotic implementation of the present invention, in the precomputation of routing tables in a hierarchical network (see FIG. 15). The flow diagram of FIG. 12 basically implements precomputation of "shortest path" routes using the shortest path algorithm of FIGS. 4A and 4B and stores the routes for different values of CTD (or t) in a routing table or cache memory of FIG. 12. The table or data base is a cache of the form (Traffic descriptor, CTD, route).

In more detail, in FIG. 12, the precomputation of routing tables starts with the selection of one (e.g., k=1) of the numbers and sizes of bandwidths (BW(k)) and cell delay variation (CTD(k)) options available for interconnection in the network. Thus, step 151 sets k=1, and step 152 selects BW(k) and CTD(k).

Step 153 sets n=1, representing the topmost level of the hierarchical network. Step 154 sets the maximum allowable amount T, according to the request, of the cumulative cell delay variation CTD(k).

Step 155 then prunes the search of the network so that only links having bandwidth greater than BW(k) are investigated. Step 156 applies the algorithm of FIGS. 4A and 4B to find the shortest paths f satisfying the CTD(k) requirement with constraint T from the appropriate node I in which this algorithm is being executed to all other nodes in the peer group at level n. Step 157 sets T equal to the cell delay variation of the logical group node that is the ancestor (in level n, FIG. 12) of node I at level n. Step 158 increments n to n+1; and step 159 uses a decision circuit to check whether n is less than or equal to the total number of levels (FIG. 12). If "yes", the process loops back to step 155. If "no", step 160 writes the computed routes into the routing database for BW(k) and CTD(k). As indicated in steps 161–163, this procedure is repeated for each available bandwidth and cell delay variation that may appear in a call setup request.

Figure 13A:
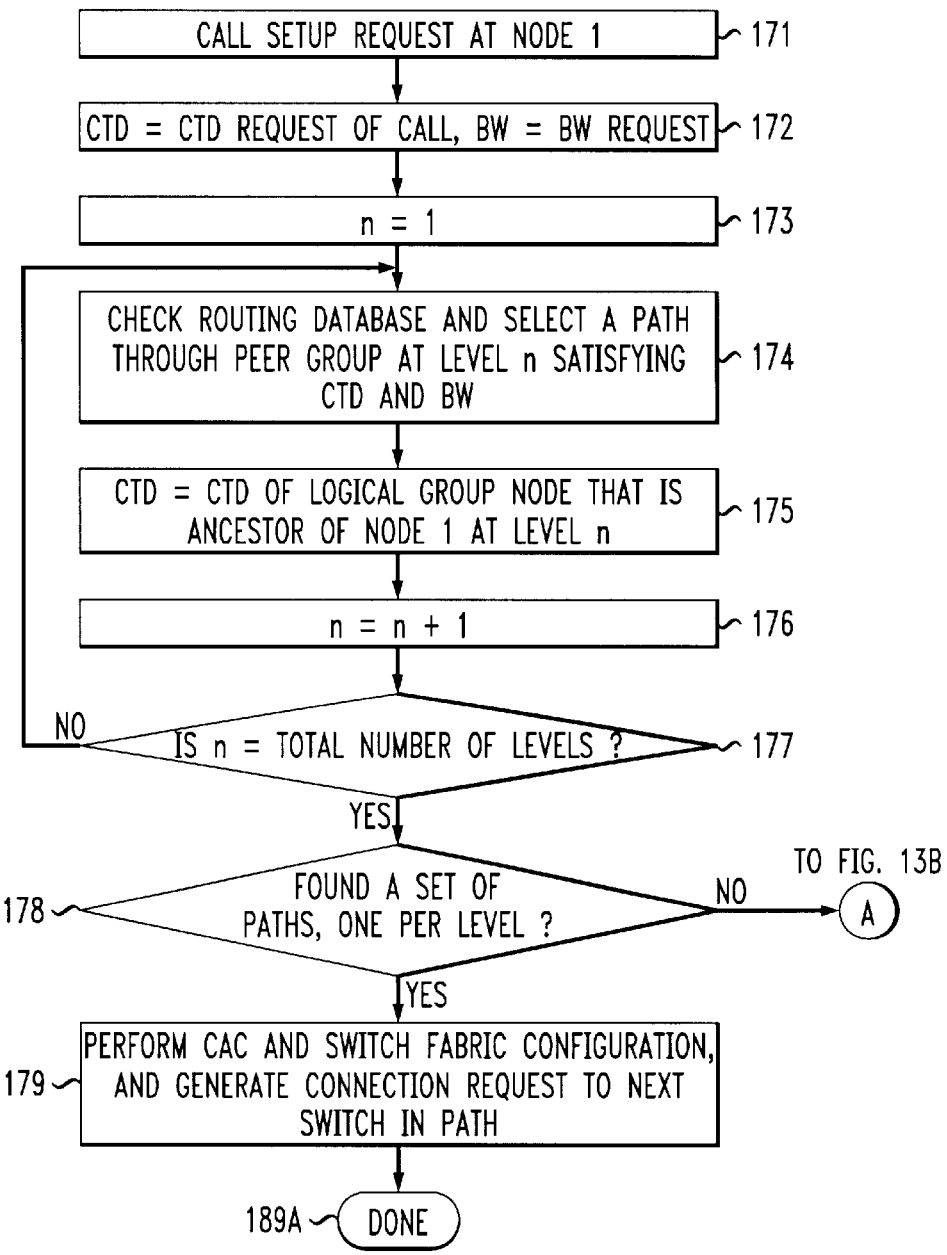

FIGS. 13A and 13B illustrate the call setup procedure invoked by a call setup request (Step 171) in a hierarchical network.

In FIG. 13A when the call setup request arrives at a switch (See FIG. 14), step 172 sets maximum cell delay variation and bandwidth equal to those specified in the call setup request. Step 173 sets n=1, representing the topmost level of the hierarchical network. Step 174 selects an optimal path through the peer group at level n from the table of precomputed routes that satisfies both the CTD and BW constraints in the call setup request.

Step 175 sets CTD equal to the CTD of the logical group node that is the ancestor of node I at level n. Step 176 increments n to n+1; and step 177 uses a decision circuit to test whether n is equal to the total number of levels. If "no", the process returns to step 174. If "yes", at step 178 a decision circuit checks whether a set of paths, one per level, was found. If so, in step 179, call admission control and switch configuration are performed, and a connection setup request to the next switch in the path is generated, the process being done, as indicated at 189A, at the current switch.

If a set of paths was not found, an on-the-fly procedure, starting at step 180 in FIG. 13B, is invoked to find an appropriate path. Step 181 resets n to 1. Step 182 prunes the search so that network links with insufficient bandwidth to satisfy the call setup request are not searched. Before the on-the-fly search is actually commenced, step 183 employs a decision circuit to decide whether the use of the constrained shortest path algorithm of FIGS. 7A and 7B is allowed. The answer is "Yes" if its use is judged to be not too expensive in terms of time and resources. Then step 184 uses the algorithm of FIGS. 7A and 7B in real time. Otherwise the answer is "No", and step 185 performs a Dijkstra shortest path algorithm with cell delay variation as the cost function. So that a set of paths through peer groups at all levels may be found, step 186 sets CTD equal to CTb of the logical group node that is the ancestor of node I at level n. Step 187 increments n to n+1. Step 188 uses a decision circuit to check whether n has reached the total number of levels. If not, the process is returned to step 182. Once a complete set of paths is found, the procedure is ended (step 189).

In all of the techniques described in FIGS. 4A–13, performance can be improved by the use of the present invention.

In FIG. 14, a switch module is shown block diagrammatically to point out the relationship between the typical switch hardware 192 and the various software or firmware and database modules 193–197, as employed according to the present invention.

In brief, the routing protocol 193, involving basic routing rules, accesses topology database 194 to set up numbering of nodes (and levels, if applicable), particularly with respect to network boundaries. Additional portions of database 194 are accessed and employed by precomputation module 195 (per FIGS. 5, 8, 10, and 12, each employing respective ones of FIGS. 4A, 4B, 7A and B) to commence the precomputation process.

The results are stored in routing database 196. Stored values in routing database 196 are fed to call processing module 197 (per FIGS. 6, 9, 11, and 13 ) upon request therefrom. Call processing module 197 appropriately activates switch hardware 192.

FIG. 15 illustrates the peer group clustering of nodes or switches in a hierarchical network. For purposes of illustration, asynchronous transfer mode switches are assumed to be at the nodes. With equal validity, other types of switches can, and are, assumed to be at the switches. Nodes at level n=M, which includes switches A.1.1, A.1.2, A.1.3, A.1.4, A.2.1, A.2.2, B.1.1, B.1.2, B.1.3, B.1.4, B.1.5, B.2.1, B.2.2, B.2.3, B.3.1, B.3.2, B.3.3, B.3.4, B.3.5, and B.3.6 represent physical switches. Nodes at higher levels, n=2 and n=1, are logical group nodes that represent peer groups.

The following description compares the DAD algorithm of the prior application, the length scaling algorithm of R. Hassin, and the DSA (delay scaling, multiple destinations) algorithm according to the present invention. Execution times were measured-on a 150 MHZ Silicon Graphics, Inc. computer using a UNIX® operating system. Performance gains were also compared. For all of our experiments the error tolerance parameter $\epsilon$ was set to 5%.

The basic standard for comparison is the performance of the classical Dijkstra unconstrained shortest path algorithm (DSP), which finds the shortest paths to all destinations without regard to delay. The gain of the other algorithms with respect to DSP can be defined as follows: Let S denote the set of nodes for which there exists a feasible path satisfying the delay constraint, $D_{min}$ but DSP found an infeasible path with delay $D_i$. Let $\dot{g}$ be the gain factor.

$$\dot{g} = \frac{\Sigma_{i \in S} \frac{D_i - D_{min}}{D_{min}}}{N_{delay} - N_{dijkstra}} \quad (1)$$

Where $D_i$, $D_{min}$ are the path delays to destination node i, $N_{delay}$ denotes the number of destinations that satisfy the delay constraint for the constrained shortest path algorithm and $N_{dijkstra}$ denotes the number of destinations, whose shortest paths using DSP happen to satisfy the delay constraint.

The results of these measures showed substantial cost and speed advantage for the scaling technique with minimal adverse impact on caller expectations.

While the invention has been described above in preferred implementations, various alternatives should be apparent from the above description or may become apparent from the practice of the invention. All implementations for delay-based shortest path selection will employ the basic advance of the invention, as set forth in the claims below or equivalents thereof The claimed invention is:

1. A method for use in a communication network having a plurality of packet switches, comprising the steps of:

accessing stored values of the topology of the network and delay-related and length-related parameters for a set of links between different ones of the plurality of packet switches; and providing to a user a connection to one or more destinations satisfying a quality of service $Q_oS$ that the user has specified, wherein the user has specified a delay threshold T of a particular delay-related parameter and has also specified a delay threshold tolerance within which the delay threshold T is to be met.

2. The method of claim 1, wherein said particular delay-related parameter is packet or cell transfer delay.

3. A method for use in a communication network having a plurality of packet switches, comprising the steps of:

accessing stored values of the topology of the network and delay-related and length-related parameters for a set of links between different ones of the plurality of packet switches in response to a user request for a connection to one or more destinations with a delay threshold T and a delay tolerance $\epsilon$; and finding a path by using a dynamic programming algorithm, including iteratively scaling the delay threshold T and the delay measures on links, starting with a small initial value of scaling factor $\tau$ and increasing the scaling factor at each iteration, computing the shortest path length using the dynamic programming algorithm, accumulating the scaled length delays in that shortest path, until the dynamic programming algorithm finds a path that satisfies the user-specified delay threshold T within the user-specified delay tolerance $\epsilon$ or, when no further increase of $\tau$ is available, finds that no path exists that satisfies the delay threshold T within the delay tolerance $\epsilon$.

4. The method of claim 3, wherein the iteratively scaling step initially sets $\tau \ll T$, and if the scaling, computing, and accumulating steps do not result in a path satisfying the user's T and $\epsilon$ specifications, $\tau$ is doubled and the scaling, computing, and accumulating steps are repeated.

5. A method for use in a communication network having a plurality of packet switches, comprising the steps of:

accessing stored values of the topology of the network and delay-related and length-related parameters for a set of links between different ones of the plurality of packet switches; and providing to a user a delay-based shortest-path connection to one or more destinations, wherein the user has specified a delay threshold T and a delay threshold tolerance within which the delay threshold is to be met, including the steps of testing combinations of links for said connection by scaling the delay threshold T to a value $\tau$, appropriately chosen to ensure delays for a maximum number of links in a shortest-path connection will accumulate to less than the user-specified delay threshold within the user-specified tolerance, correspondingly scaling a delay parameter on each link, and then truncating all the scaled values to integers, computing the shortest length path by using a dynamic programming algorithm, and accumulating the scaled link delays for a connection using the just-computed shortest path to determine whether that path satisfied the specified delay threshold within the specified delay threshold tolerance.

6. The method of claim 5, wherein said particular delay-related parameter is packet or cell transfer delay.

7. The method of claim 5, wherein the scaling steps include multiplying the delay-related parameter of each link by a factor of $\tau/T$, where $\tau=\min(T, (n-1)/\epsilon)$, and then truncating each scaled delay-related parameter to an integer, wherein the accumulating step will result in a shortest path delay no greater than $$T(1+\epsilon),$$

n being the maximum number of links in the shortest path.

8. A communication system, comprising:

a network having a topology including a plurality of communication links and a plurality of packet switches;

data processing apparatus for accessing stored values of the topology of the network and delay-related and length-related parameters for sets of links between switches including the plurality of packet switches; and apparatus for providing a delay-based shortest-path connection between two or more users, including means for testing various ones of the sets of links for the connection, said testing means including a central processing unit adapted to include routines to provide to a user a connection to one or more destinations satisfying a quality of service $Q_oS$ that the user has specified, wherein the user has specified a delay threshold T of a particular delay-related parameter and has also specified a delay threshold tolerance within which the delay threshold T is to be met.

9. The system of claim 8, wherein said particular delay-related parameter is packet or cell transfer delay.

10. A communication system, comprising:

a network having a topology including a plurality of communication links and a plurality of packet switches;

means for accessing stored values of the topology of the network and delay-related and length-related parameters for sets of links between switches including the plurality of packet switches; and means for providing a delay-based shortest-path connection from a user to one or more destinations, the user having specified both a delay threshold T and a delay tolerance $\epsilon$, including means for testing various ones of the sets of links for the connection, said testing means including a central processing unit adapted to include routines including a dynamic programming routine for finding said connection and an iterative routine for scaling the delay threshold T and the delay measures on links, starting with a small initial value of scaling factor $\tau$ and increasing the scaling factor at each iteration, computing the shortest path length using the dynamic programming algorithm, accumulating the scaled length delays in that shortest path, until the dynamic programming algorithm finds a path that satisfies the user-specified delay threshold T within the user-specified delay tolerance $\epsilon$ or, when no further increase of $\tau$ is available, finds that no path exists that satisfies the delay threshold T within the delay tolerance $\epsilon$.

11. The system of claim 10, wherein said particular delay-related parameter is packet or cell transfer delay.

12. A communication system, comprising:

a network having a topology including a plurality of communication links and a plurality of packet switches;

means for accessing stored values of the topology of the network and delay-related and length-related parameters for sets of links between switches including the plurality of packet switches; and means for providing a delay-based shortest-path connection from a user to one or more destinations via at least one of the plurality of packet switches, including means for testing various ones of the sets of links for the connection, said testing means including a central processing unit adapted to include routines to scale the delay threshold T to a value $\tau$, appropriately chosen to ensure delays for a maximum number of links in a shortest-path connection will accumulate to less than the user-specified delay threshold within the user-specified tolerance, correspondingly scaling a delay parameter on each link, and then truncating all the scaled values to integers, computing the shortest length path by using a dynamic programming algorithm; and accumulating the scaled link delays for a connection using the just-computed shortest path.

13. The system of claim 12 further including means for precomputing and storing a multiplicity of sets of shortest paths.

14. The system of claim 12, wherein said particular delay-related parameter is packet or cell transfer delay.

* * * * *